(12) United States Patent
Kaltenheuser

(10) Patent No.: US 7,507,917 B2
(45) Date of Patent: Mar. 24, 2009

(54) APPARATUS AND METHOD FOR WEIGHING CROP ON BOARD A HARVESTER

(76) Inventor: Steven R. Kaltenheuser, 50690 270th St., Ames, IA (US) 50014-9536

( * ) Notice: Subject to any disclaimer, the term of this patent is extended or adjusted under 35 U.S.C. 154(b) by 570 days.

(21) Appl. No.: 11/211,775

(22) Filed: Aug. 25, 2005

(65) Prior Publication Data

US 2006/0046800 A1    Mar. 2, 2006

Related U.S. Application Data

(60) Provisional application No. 60/604,402, filed on Aug. 25, 2004.

(51) Int. Cl.
| | |
|---|---|
| G01G 19/12 | (2006.01) |
| G01G 21/00 | (2006.01) |
| G01G 23/01 | (2006.01) |

(52) U.S. Cl. .......................... 177/136; 177/137; 701/50; 702/102; 702/174; 73/1.15

(58) Field of Classification Search ......... 177/136–141; 701/50; 702/174, 175, 101, 102; 73/1.13, 73/1.15

See application file for complete search history.

(56) References Cited

U.S. PATENT DOCUMENTS

| | | | | |
|---|---|---|---|---|
| 3,241,626 A | * | 3/1966 | Woodburn | 177/137 |
| 3,650,340 A | * | 3/1972 | Bradley | 177/136 |
| 3,669,756 A | * | 6/1972 | Bradley | 177/136 |
| 4,362,097 A | | 12/1982 | Rogers | |
| 4,742,880 A | | 5/1988 | Schrag et al. | |
| 4,893,241 A | * | 1/1990 | Girodat et al. | 701/50 |
| 5,429,436 A | * | 7/1995 | Stone | 366/141 |
| 5,478,974 A | | 12/1995 | O'Dea | |
| 5,518,454 A | | 5/1996 | Twilley et al. | |
| 5,522,468 A | | 6/1996 | Dohrmann et al. | |
| 5,610,372 A | | 3/1997 | Phillips et al. | |
| 5,695,157 A | | 12/1997 | Coirier et al. | |
| 5,902,966 A | * | 5/1999 | VonMuenster | 177/136 |
| 5,957,773 A | | 9/1999 | Olmsted et al. | |
| 6,029,107 A | | 2/2000 | Sato | |
| 6,037,550 A | | 3/2000 | Bradley | |
| 6,150,617 A | * | 11/2000 | Hart et al. | 177/25.13 |
| 6,157,889 A | | 12/2000 | Baker | |
| 6,169,949 B1 | | 1/2001 | Sato | |
| 6,313,414 B1 | * | 11/2001 | Campbell | 177/16 |
| 6,378,276 B1 | | 4/2002 | Dorge et al. | |

(Continued)

FOREIGN PATENT DOCUMENTS

EP    0042245 A1    12/1981

(Continued)

*Primary Examiner*—Randy W Gibson
(74) *Attorney, Agent, or Firm*—McKee, Voorhees & Sease, P.L.C.

(57) ABSTRACT

The present invention relates to an apparatus and method for weighing crop on board a self-propelled harvesting machine. Specifically, the plurality of load cell assemblies are placed in the axle assemblies of the machine and are in communication with an intelligent control so that the weight of the harvested product contained in the hopper of the machine can be accurately weighed. A method for weighing harvested product on board a self-propelled harvesting machine is also disclosed using the apparatus described herein.

59 Claims, 13 Drawing Sheets

U.S. PATENT DOCUMENTS

| | | |
|---|---|---|
| 6,525,276 B1 | 2/2003 | Vellidus et al. |
| 6,636,820 B2 * | 10/2003 | Livingston .................. 702/101 |
| 6,732,667 B1 | 5/2004 | Wilson |
| 7,241,956 B1 * | 7/2007 | Stimpson ..................... 177/136 |
| 7,302,837 B2 * | 12/2007 | Wendte ...................... 73/146.5 |
| 7,343,262 B2 * | 3/2008 | Baumgarten et al. ........ 702/129 |
| 2002/0133309 A1 | 9/2002 | Hardt |
| 2003/0158684 A1 * | 8/2003 | Livingston .................. 702/101 |

FOREIGN PATENT DOCUMENTS

| | | | |
|---|---|---|---|
| GB | 2301193 A * | 11/1996 | .................. 177/137 |

* cited by examiner

APPARATUS AND METHOD FOR WEIGHING CROP ON BOARD A HARVESTER

CROSS-REFERENCE TO RELATED APPLICATIONS

This application is a conversion of and claims priority to U.S. Provisional Patent Application No. 60/604,402 filed Aug. 25, 2004, which is herein incorporated by reference in its entirety.

BACKGROUND OF THE INVENTION

1. Field of the Invention

The present invention relates to crop harvesting equipment and methods, and in particular, an apparatus and method of weighing harvested crop on board a harvesting machine such as, for one example, a grain combine.

2. Problems in the Art

Agriculture is a business. Viability depends on profitability. Like any business, there is a constant need to reappraise practices to see if profitability can be increased. Profitability is a significant issue in recent times. Market prices for many staple grain crops have stayed at relatively low levels. Despite inflation and increased production costs (labor, machinery, chemicals, etc.), low crop prices have economically squeezed the American farmer.

In past years, focus has been placed on increasing yield per acre to increase profitability. However, this does not guarantee economic success. Land availability and cost, labor availability and cost, and equipment costs are such that it is not possible to infinitely increase the amount of harvest or number of acres harvested. Additionally, there is, of course, a limited amount of time for any farmer, even with today's automation, to harvest crop.

The present inventor has identified one area of inefficiency that, if solved, can increase efficiency of harvesting crops. Though subtle, it can represent a significant savings in costs, labor, and stress during harvesting. At the very least, it can save money for the farmer at harvest. Hopefully, increased efficiency will increase the economy (and profitability) of harvesting and, thus, the profitability of farming as an occupation.

The following example is illustrative of the problem identified by the inventor. There is a limited window of time to harvest grain crops at maturity. Large, automated multi-row harvesting machines, sometimes called harvesters or combines, have greatly improved the efficiency of extracting the grain from the plants. Multiple rows of crops such as field corn or soybeans can be simultaneously cut, threshed, separated and cleaned on-board the machine. However, the onboard storage of the combine is much less than the total amount of crop harvested from a field. Each time the storage hopper on the harvester gets full, the combine must be unloaded.

One alternative is for the combine operator to stop and off-load the grain from the on-board hopper to another vehicle (e.g. truck, wagon, or semi-trailer). Or quite often, another vehicle, such as a tractor pulling a grain cart, travels alongside the combine and the off-loading is continuous while the combine is harvesting so that the combine can continuously run. The grain from the grain cart must then be loaded onto another vehicle, such as a semi-trailer or a wagon pulled by a tractor, for transport to a central storage location (e.g., a grain bin on the farmer's farm or a commercial grain elevator/storage facility). In any event, time and resources are spent offloading the harvested grain from the grain cart to another vehicle, such as a semi-trailer.

For a farmer who is renting land, a common financial/rental arrangement between the farmer and the landlord is known as "crop-sharing." Under a crop-sharing agreement, the farmer/renter is responsible for costs and actions to plant and harvest the crop. Rent for use of the land is by division of the harvested crop between the farmer/renter and the landowner. A single farmer/renter may be renting land from many landowners and therefore may have several landlords with whom he divides portions of his crop. Thus, it is extremely important that an accurate record of the crop being harvested be kept so that the farmer knows how much of the crop goes to each landlord and how much he can keep for himself. Therefore, this record-keeping for dividing the crop requires that the crop be weighed immediately after it is harvested.

One method involves using the semi-trailer or wagon to drive to a commercial scale before unloading the grain at the central storage location. The farmer then keeps track of the weight of each truck load from the commercial scale so that the farmer/renter and the landlord can make a proper division of the crop at a later time. However, this process involves several inefficiencies, such as extra time, labor, and fuel costs, especially if the commercial scale is many miles away from the field where harvest is occurring. Therefore, this alternative is disfavored by many renters/farmers.

Another attempt to provide this information has been the use of yield monitors. For example, there are a variety of yield sensors or monitors available commercially and installed or installable on combines. Examples are U.S. Pat. Nos. 6,460,008 and 6,584,424. The yield monitors attempt to derive the amount of crop coming into the harvester in the threshing, separating, cleaning subsystem and make an estimation of amount of yield per acre. While they can provide reasonable estimates of amount of grain at certain times, at other times they can produce substantial errors. There are many variables that go into yield monitoring and conversion to amount harvested, and they have been found to be unreliable. Yield monitors measure grain flow into the combine, i.e., a volumetric flow measurement which can be imprecise in itself unless the monitor is calibrated correctly. Therefore, to get weight from these yield monitors, the volumetric measurement must be converted using several variables, such as density and moisture of the grain. Therefore, they need to be calibrated carefully for each field and/or environmental conditions. One example of their lack of consistency or reliability is the lack of universal acceptance of the same by crop insurers or other third parties. One measurement may be within unacceptable range of accuracy. The next, though, they might be off substantially (e.g., a thousand or more pounds).

Thus, trying to weigh grain on board a combine is not trivial. Some how you would have to isolate the grain hopper from the remainder of the combine. The hopper holds thousands of pounds of grain and is connected to the remainder of the combine body. Additionally, the combine, at least when moving, is experiencing substantial vibration and forces. The development and reliance and yield monitors has been previously noted. They have been found too inconsistent, however.

Presently, many farmers use the grain cart as the step in the harvest process where the grain is weighed so that a record of the crop can be kept for dividing it between the landlord and farmer/renter. Some grain carts include sensors from which the weight of the grain can be derived. One example is grain carts that utilize strain gauges or load cells between the grain cart hopper and the trailer hitch and trailer wheels. By calibration, an estimate of the weight of the hopper when empty can be derived. Then, when full of grain, the weight of the hopper can be subtracted and the weight of the grain in the hopper estimated. The grain cart operator can record the weight of the crop in the hopper, and repeat the same for all of the crop from a field to record a cumulative weight of crop for the field. Types of these grain carts are commercially available. There can be accuracy problems with this arrangement, however. Because loads on all wheels of the trailer or cart, as well as on the tractor hitch connection between the cart and tractor must be summed, the trailer or cart must be on fairly level ground to get a reasonably accurate reading. If not, or if there is some abnormal strain or load on the hitch (like when the cart/trailer is not on level ground), it can materially affect the readings and the accuracy of the weight of the grain in the trailer hopper. There were concerns whether load cells could satisfactorily work to derive weight of what is held in the hopper of a grain cart. They have to measure significant loads on the order of tens of thousand of pounds, and it is difficult to place the load cells within the physical structure of the grain cart. The grain carts also travel over bumps, rocks, and other variations in terrain, and experience substantial vibrations and other forces. Based on information and belief, placement of load cells in grain carts has been possible because they do not have driven axles or driven wheels. Grain carts, like other trailers, only have non-driven axles and wheels that are pulled along by the tractor.

The basic theory of load cells on a grain cart is that load cells can be made structurally strong enough to fit between the non-driven wheels and the axels of the grain cart such that the frame and hopper of the grain cart are suspended on the load cells. The load cells essentially have structural integrity to become part of the non-driven dead axles. Of course, this does not work for self-propelled combines because there are driven wheels that require a drive train. Additionally, the mass of the unloaded combine is usually bigger than the grain cart and would not be supported on simply one load cell per wheel. Therefore, accurate on-field weighing has conventionally been constrained to grain carts with load cells.

But using the intermediate step of the tractor/grain cart combination to weigh the harvested grain costs the farmer tens of thousands of dollars every year. Grain carts cost on the order of $60,000. A tractor large enough to pull the grain cart costs on the order of $100,000. A hired worker to operate the tractor and grain cart costs on the order of $7000 just during the harvest season. The fuel cost for the tractor pulling the grain cart can be on the order $8000 per year and continues to escalate with rising fuel costs.

Thus, if fuel, labor, and equipment depreciation costs are added together, the cost of operating a tractor/grain cart combination can be approximately $30,000 per year for a grain cart that is servicing two combines operating simultaneously in the same field.

In addition to these significant monetary costs, using a grain cart to weigh the grain from the combine forces the farmer to operate all of his combines in the same field. It would be grossly inefficient and not practical to have the grain cart traveling between fields trying to catch the grain from multiple combines if they were operating in different fields which could be miles apart.

A still further important consideration is soil compaction. A large second vehicle, like a grain cart and four wheel drive tractor combination is very heavy (e.g., tens of thousands of pounds on each wheel and axle), especially when the grain cart is loaded. This second vehicle adds significant soil compaction to the field. It is widely acknowledged that soil compaction increases costs in preparing the field for the next crop (e.g., more difficult to till), and can even materially adversely affect yield from the field because of the compacted soil bed.

As can be readily seen, using a tractor and grain cart procedure includes substantial labor, fuel, and equipment costs as well as causing soil compaction and other inefficiencies.

It also should be noted that harvesting places certain physical and physiological stresses on those involved. For example, preferably a crop is harvested as quickly as possible. Most farmers, by practicalities, do not have unlimited equipment and labor resources. Therefore, many work long, continuous hours; sometimes around the clock. An improvement in operator ease during harvest can beneficially impact those issues.

The above examples are but a few illustrations of the need identified in the art for a more efficient way to remove and weigh grain from a field during harvesting. Additionally, a real need in the art exists for a better way of removing and weighing grain from the field which requires fewer people and/or less fuel and/or less time and/or less equipment costs.

The present invention solves these and other problems by eliminating an intermediate step during harvest. With the present invention, the combine can now accurately weigh the grain being harvested. The farmer/renter no longer needs an expensive grain cart (on the order of $60,000 to 80,000) with an expensive tractor pulling it (on the order of $100,000.00) to weigh the grain before loading the grain on to a truck to be hauled away. Elimination of the grain cart for weighing grain eliminates significant fuel and equipment costs, reduces soil compaction by having one less implement in the field, and reduces labor costs by reducing the number of workers required during the harvest process.

SUMMARY OF THE INVENTION

It is therefore a principle object, feature, aspect and advantage of the present invention to provide a method and apparatus which improves over or solves problems and deficiencies in the art. Further objects, features, aspects and advantages of the present invention include an apparatus and method which:
  a. materially saves costs and resources in the harvesting process.
  b. allows estimation by weight of harvested crop on-board the harvesting machine.
  c. can materially reduce labor, equipment, fuel and/or time resources when harvesting.
  d. is non-complex, efficient and economical.
  e. is durable, even in outside environmental conditions associated with crop harvesting.
  f. can improve the economics of taking crop out of a field.
  g. can reduce soil compaction.
  h. can provide flexibility to and well-being of the farmer, combine operator, or other workers or parties of interest during harvest.
  i. has a consistent and high level of accuracy when calibrated (e.g. a few %, and preferably less than 1%, variance from actual) that can allow it to be recognized as acceptable by third parties, such as grain elevators, seed companies, crop insurers, and others.
  j. works on self-propelled vehicles or vehicles with at least one driven axle or wheel.

One aspect of the present invention is an apparatus and method of accurately estimating yield of a harvested crop by weighing the harvested crop on-board a harvesting machine.

Another aspect of the present invention is an apparatus and method of providing the potential to harvest crop from a field for less cost even if it takes a longer time.

Another aspect of the present invention is an apparatus and method of saving time and resources in determining a division of harvested crop by weighing harvested crop on board the harvesting machine, keeping track of each batch of harvested crop weighed, and at the end of harvesting of the field having a cumulative total based from the on-board measurements.

A further aspect of the present invention relates to a harvesting machine that comprises a frame, motor, drive train and ground contacting wheels or members that supports, moves, and powers a harvesting system. A device from which weight can be derived of the on-board grain hopper, both when empty and when partially or fully filled with grain, is included on-board the harvesting machine. Weight of each batch of harvested grain can be derived on-board the harvesting machine.

In a further aspect of the present invention, a device from which weight of harvested grain can be derived comprises sensors placed between the ground contacting wheels of the machine and at least a portion of a harvesting machine with at least one driven axle or wheel that carries the harvested grain. By comparing the weight measurement derived by the device for an empty machine versus a full or partially full machine, weight of the crop harvested can be derived on-board.

And still another aspect of the present invention, a device for deriving weight of harvested crop on board a harvesting machine comprises load sensing devices that at least substantially isolate a part of the harvesting machine including the grain hopper from the remainder of the machine below it. In one embodiment the load sensing devices are mounted between each ground contacting wheel or track and its respective axle or spindle. One example of a load sensing device is an assembly including a load cell, and sometimes such an assembly is called a weigh bar. By interposing the load sensing devices in this way, the load generated by gravity by the combine at each ground-contacting portion of the machine can be sensed and added together. By known relationships, the sensors can be calibrated to a high level of accuracy to allow derivation of weight of an empty combine. Weight of harvested crop can then be derived from reading the load sensing devices when any harvested crop is filled by the machine into its hopper.

DESCRIPTION OF EXEMPLARY EMBODIMENTS

Overview

Figure 1:
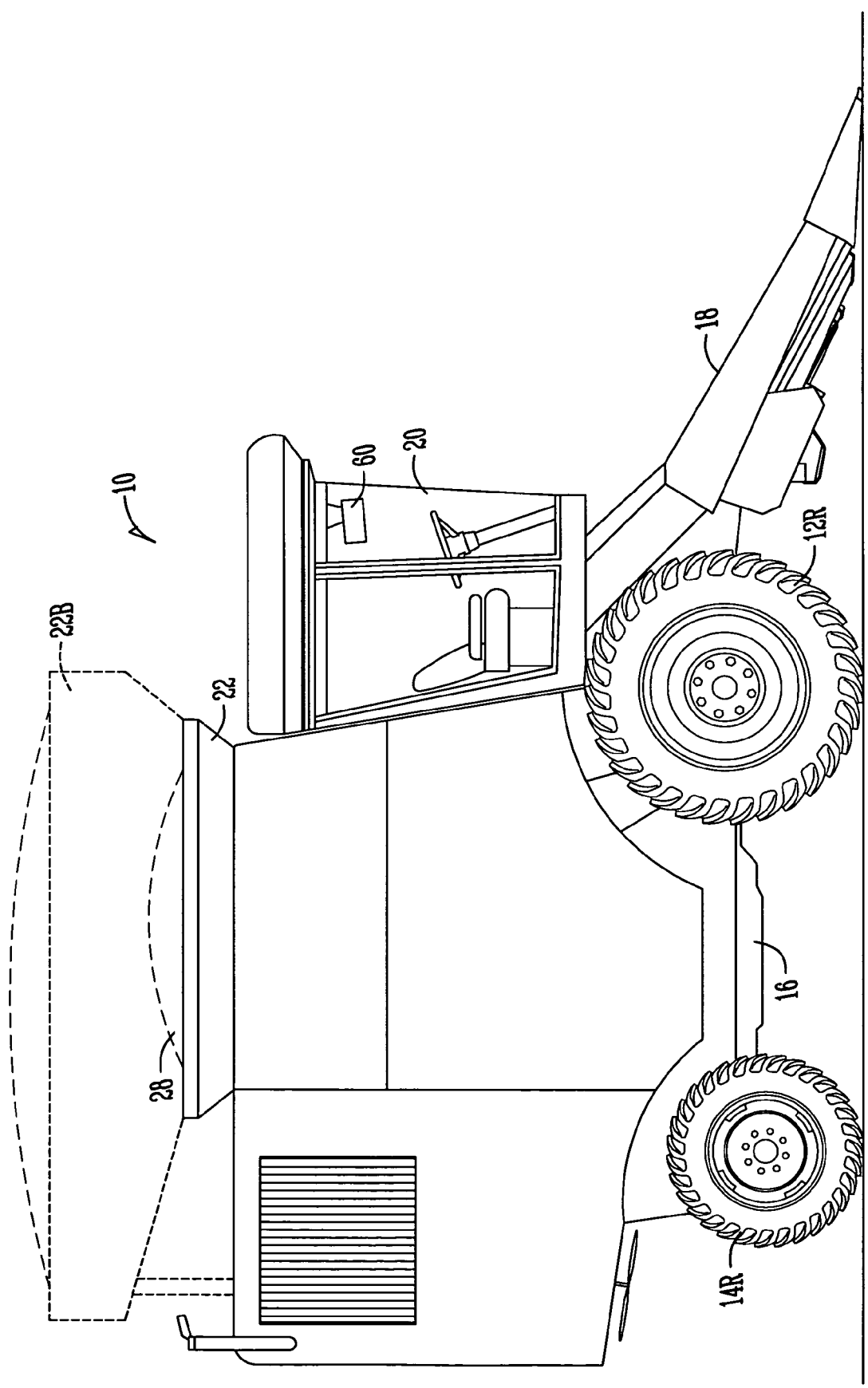
FIG. 1 is a side elevation view of a typical combine harvesting machine.

For a better understanding of aspects of the present invention, detailed examples will now be described. It is to be understood, however, that these are just exemplary forms the invention can take. Variations obvious to those skilled in the art will be included within the scope of the invention. These exemplary embodiments are not a limitation to the invention but are intended solely to show some ways to make and use the invention.

The term "weight sensor" will be used from time to time. It is intended to mean a sensor or transducer from which a weight can be derived. It could be of a variety of forms including, but not limited to, mechanical, hydraulic, pneumatic, electrical, electronic, or electromechanical. One example of a "weight sensor" is one that uses a load cell, such as is well-known. A load cell is a transducer that converts a force (e.g. a load acting on it) into a measurable electrical output (e.g. an analog electrical signal). Many load cells achieve this by bonding to a load cell beam one or more strain gauges and wiring the strain gauges into a circuit (Wheatstone bridge). Physical deformation (e.g. by bending, sheer forces, compression, tension, etc.) of the strain gauges causes a change of electrical resistance which is proportional to the force acting in it, and which can be measured with the electrical circuit. One example has four strain gauges, two in compression and two in tension, bonded to a beam and wired to the Wheatstone bridge or other electrical circuit to compensate for various things (e.g. temperature). Some types of weight sensors use a load cell in an assembly. Some types of weight sensors are called weigh-bars. Some in the art use the term weigh bar interchangeably with load cell. Therefore, herein the term "load cell" and "weigh-bar" will sometimes be used interchangeably and can refer either to an element of the weight sensor (e.g. to the strain gauge element) or to most of or even the entire weight sensor (e.g. the strain gauge element, its supporting structure or housing, and circuitry associated with it; in other words, an entire load or weight sensing assembly).

Context of Exemplary Embodiment

An example that will now be discussed in detail relates to a self-propelled combine for harvesting field corn. The basic combine machine is commercially available from a variety of sources such as from Case-New Holland, John Deere, or AgCo dealers. This exemplary embodiment will also be described in the context of harvesting the grain from a defined, specific acreage of land that is owned by a landowner but rented by a farmer that produces the crop and pays rent to the landowner by dividing the crop from the defined piece of land.

It is to be emphasized, however, that the methods and apparatus described with respect to this exemplary embodiment are not limited to these situations. For example, the harvesting machine can be a harvester or picker for other things. A few examples are soybeans, wheat, barley, rye, oats, cotton, potatoes, beets, or other crops harvested by a machine. Other machines are possible. The additional example is a seed corn picker. The apparatus and method can be applied to any harvesting or analogous applications, irregardless of the nature of ownership of the land and disposition of the crop.

Apparatus

An apparatus according to one aspect or example of the invention, as applied to a larger self-propelled grain combine, is described as follows.

A Reason for On-board Combine Scale

As discussed above, many times during normal operation, a larger combine (6-8 row corn head) is followed by a large grain cart (1000 bu.) being pulled by a four wheel drive tractor. The reason for this is because the grain has to be weighed before being loaded on a truck for transport to another location (usually for storage). A grain cart has this capability, but it is a large cost to the farmer.

1. Grain cart with scale and tracks—$60,000.00 (approx.)
2. Four wheel drive tractor to pull it—$100,000.00 (approx.)
3. A qualified person to operate tractor and grain cart—$50,000.00 (annual approx.).

An electronic on-board combine scale could produce an economic advantage (estimated annual savings of $26,000.00). This savings would include savings from depreciation on the grain cart and tractor, and a portion of salary for this operation. Fuel cost savings, especially at present prices, can also represent a substantial savings.

Construction of Scale on a Combine.

Construction of this scale consists of figuring out how to weigh the whole combine, including the corn head or grain head. This was accomplished by using;

8—Model 2.875 DB—16 Digi-Star weigh bars (commercially available from Digi-Star, LLC, 790 West Rockwell Ave., Fort Atkinson, Wis. 53538)
    2—Model 145004 spindle type weigh bars (Digi-Star)
    2—Junction boxes (Digi Star)
    1—Digi-Star model EZ2000 Scale Console.

On the front axle of the combine, the axle extension, which measures 11¾" wide, was removed from each side to come up with the desired wheel spacing for different row crop spacings and different tire sizes.

To the outside of the axle extension is the final drive gear box. This gear box puts out the correct axle R.P.M. and provides a hub to bolt the rim and tire to. A floating drive shaft provides power from the transmission to the final drive. Brackets are bolted to the axle and the final drive assembly; one to each. These two brackets are then connected together by using four Digi Star weigh bars rated at 20,000 pounds each. The bars are secured to the bracket that is bolted to the axle. The outer bracket is secured to the weigh bars. The final drive gear box is then bolted to the outer bracket and the wheel, rim and tire are bolted back onto the final drive assembly.

The upward force that is generated in the weigh bars is electronically sent to the scale console and a reading in pounds is provided.

The rear axle also had to be rebuilt to accept weigh bars. This was done by cutting the O.E.M. spindle off of the spindle assembly. Then 4" O.D. tubing was welded to the spindle assembly and secured with a variety of gussets and plate steel. This allowed Model 145004 Digi Star weigh bar spindles to be inserted in the tubing and bolted.

All ten weigh bar wiring harnesses go to a junction box and from the junction box to the scale console.

One way to build such a s system is illustrated in the drawings (FIGS. 1-11). Frequent reference will be made to the drawings in this description. Reference numbers will be used to indicate certain parts and locations in the drawings. The same reference numbers will be used to indicate the same or similar parts or locations throughout all the drawings unless otherwise indicated.

1. Conventional Features of Grain Combines

Conventional grain combines have several separate subsystems. If self-propelled, there is an internal combustion engine carried on a frame. A drive train supplies power from the engine to at least one ground-contacting drive wheel or track. One conventional example has a large pair of drive wheels at the front of the combine powered through what is sometimes called a final drive assembly, a gear box connected to the drive shaft distributed to each wheel. A pair of rear wheels connected by an axle are steerable. Thus, the first subsystem is basically a self-powered, motive combination of a pair of front driven wheels and a pair of rear (driven or non-driven) wheels on a frame carrying a motor with power distributed to front drive wheels.

A second subsystem, usually in the form of a harvesting head, brings the crop into the machine.

A third subsystem processes whatever is brought into the machine. In the example of grain, the subsystem threshes, separates, and cleans the grain.

A fourth subsystem moves the harvested grain to an on-board storage bin or hopper.

A fifth subsystem allows unloading of the storage bin or hopper to off-board the harvesting machine.

Thus, as is well-known and explained U.S. Pat. No. 4,150, 525 (herein incorporated by reference in its entirety), the various subsystems allow one operator to harvest a crop from the field in batches.

The present exemplary embodiment places a device that can derive the weight of the harvested crop while the harvested crop is still on board the combine.

U.S. Pat. No. 5,290,201 (herein incorporated by reference in its entirety) shows in more detail one example of a drive system for a combine. It shows how (FIG. 5) a gear train or final drive assembly can be positioned between ground contacting drive wheels 24 and 26 and the drive shaft. FIG. 6 shows in more detail the gearing arrangement. Many self-propelled combines have this arrangement—a final drive assembly at or near the driving wheels or tracks.

U.S. Pat. No. 6,267,198 (herein incorporated by reference in its entirety) shows a rear steerable set of non-driven, ground-contacting wheels, with an axle and kingpins. Some rear wheels are driven or have a power assist, such as a rear wheel assist system which allows the operator to switch from 2-wheel to 4-wheel drive.

2. Modified Combine (FIGS. 1-11)

The present exemplary embodiment places a device that can derive the weight of the harvested crop while the harvested crop is still on board the combine. Referring now to FIGS. 1-11, one version of an embodiment of an apparatus according to the present invention will be described.

a) General Concept

FIG. 1 illustrates in simplified side elevation form a self-propelled combine 10 which includes standard features like left and right front driven wheels 12L and 12R, rear non-driven wheels 14L and 14R, frame 16, corn head 18, operator cab 20 (with digital scale/microprocessor 60), and on-board hopper 22 (which holds harvested, separated and cleaned corn 28). These are conventional features for a corn combine.

Figure 2:
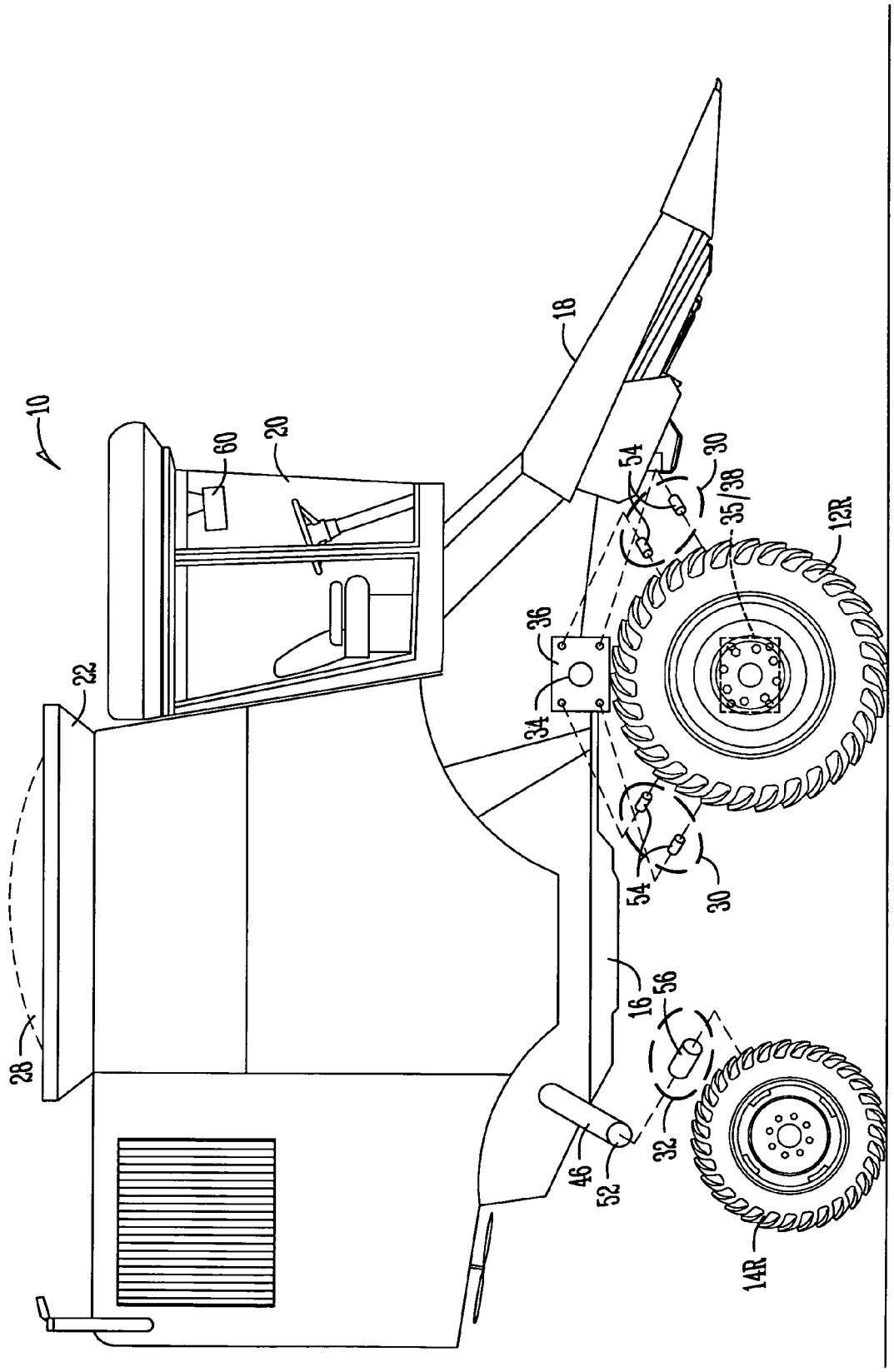
FIG. 2 is a side elevation, partially exploded view of the combine harvesting machine of FIG. 1.
Figure 3:
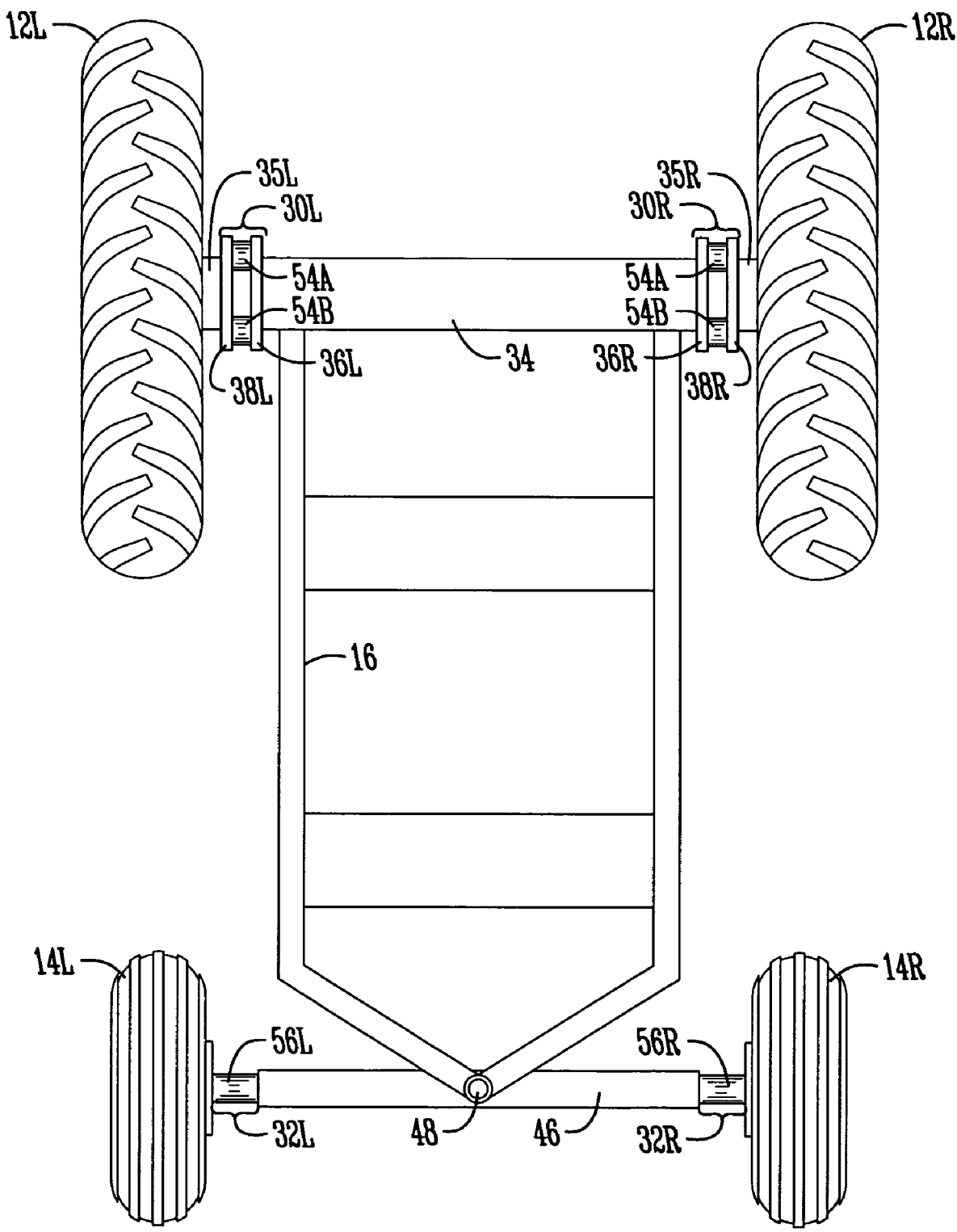
FIG. 3 is a top plan view of a frame and ground contacting members of a harvesting machine like FIG. 2 which shows how the present invention can fit into the front and rear axle assemblies of the combine harvesting machine.

As illustrated in FIGS. 2 and 3, the general modification of combine 10 according to this example of the invention is to essentially isolate or suspend combine 10 on load cells or weigh bars.

Figure 4:
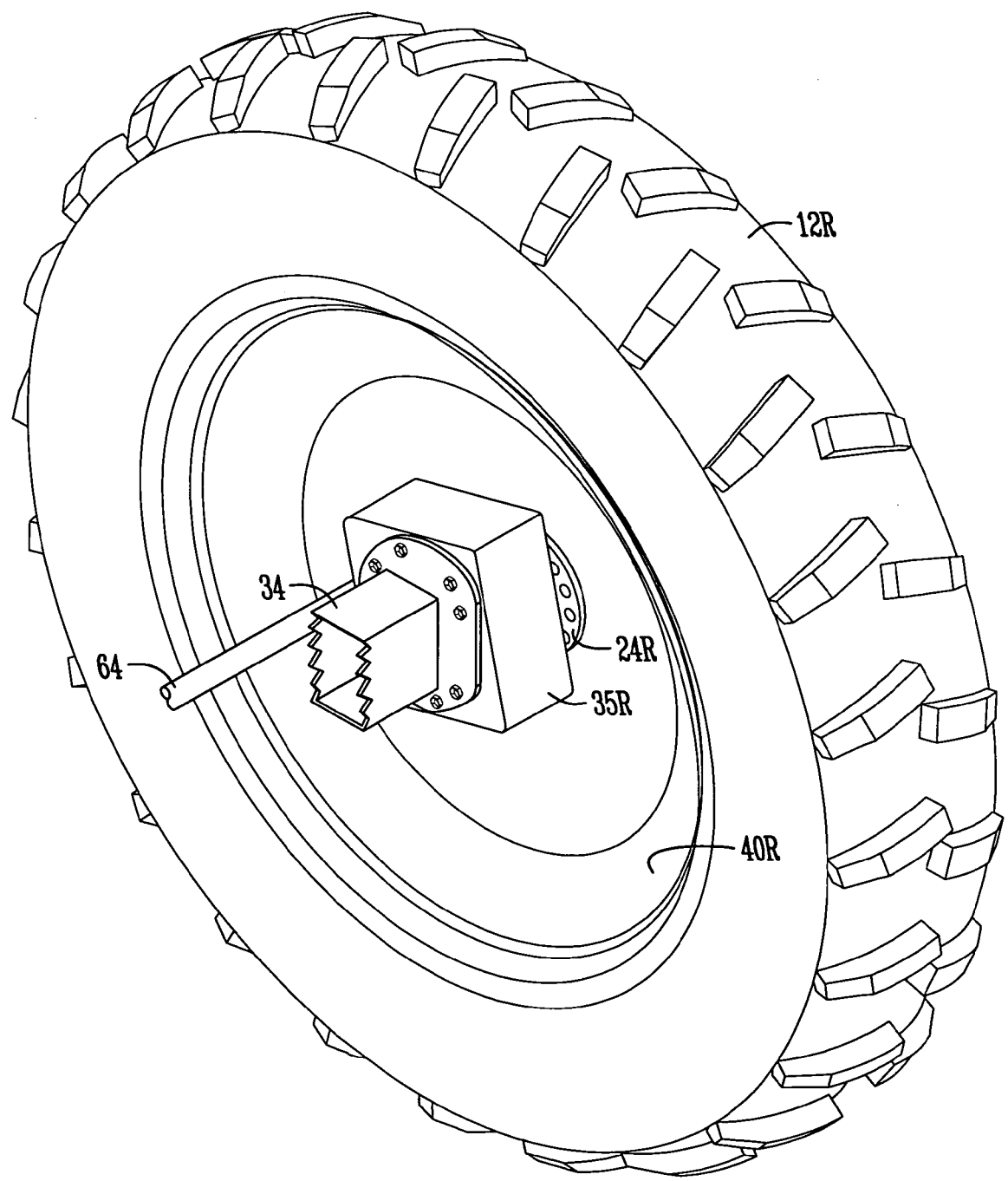
FIG. 4 is an enlarged, isolated perspective view of a prior art front axle and final drive assembly on a combine harvesting machine of the type of FIG. 1.
Figure 5A:
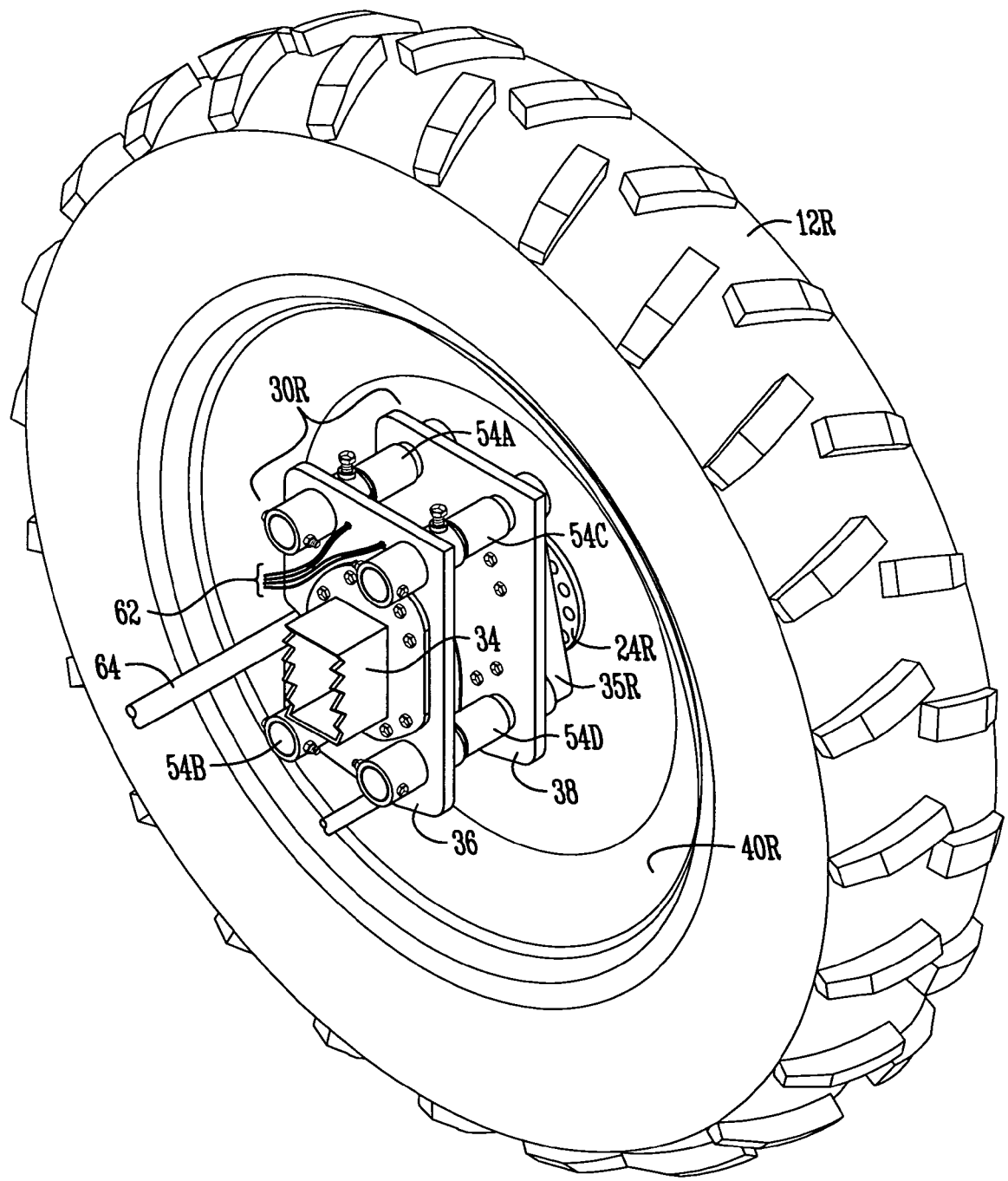
FIG. 5A is a perspective view of the front axle and final drive assembly of FIG. 4 with one embodiment of the present invention added.
Figure 5B:
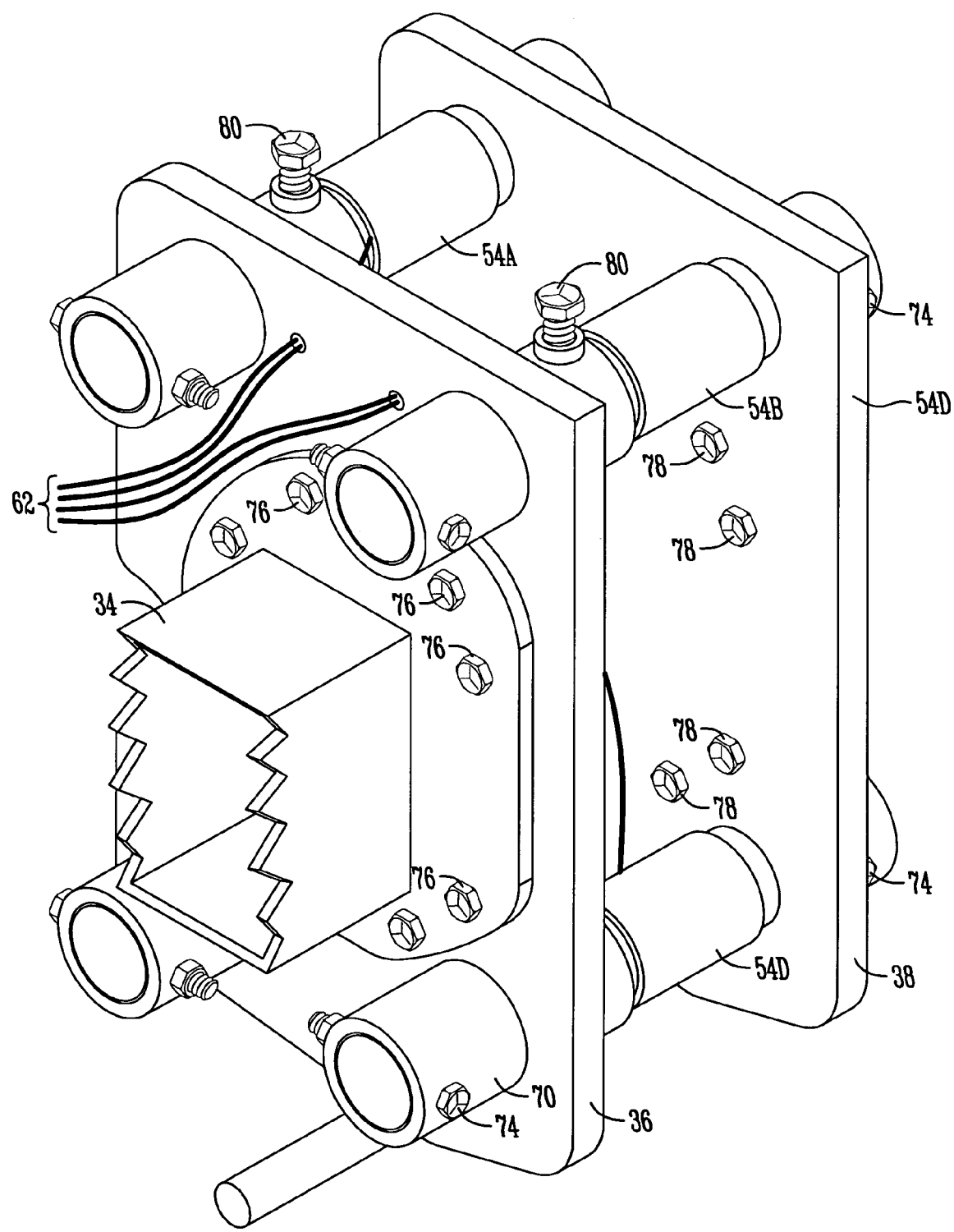
FIG. 5B is an enlarged, isolated perspective view of the embodiment of the present invention shown in FIG. 5A.
Figure 6:
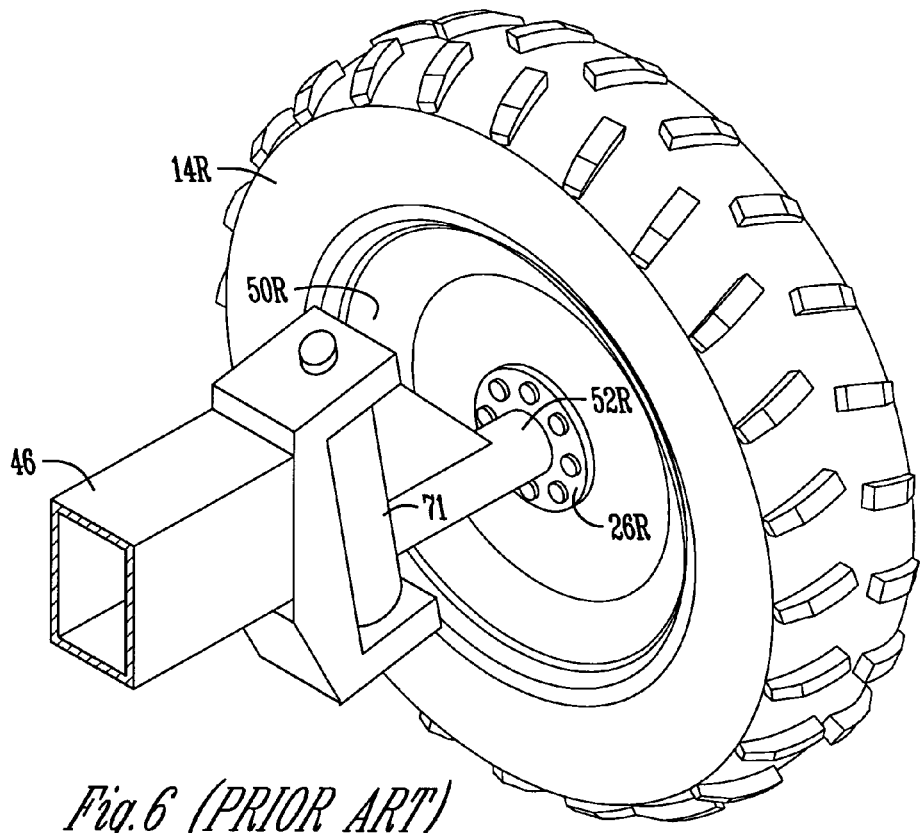
FIG. 6 is a perspective view of a typical prior art rear axle assembly of a combine harvesting machine of the type of FIG. 1.

In this embodiment, the front weigh bars 54, such as in FIGS. 3 and 5A-B, (e.g., Model 2.875 DB—16 from Digi-Star LLC, of Fort Atkinson, Wis., USA) are a set of four for each front wheel 12. The set of four are mounted between a first plate 36 bolted or otherwise attached to the end of front dead axle 34, and a second plate 38 bolted or otherwise attached to the final drive assembly 35 which turns, in response to drive shaft 64 from the combine motor, a driven spindle (see FIGS. 4 and 5A), which turns a front hub 24 which is bolted to the rim 40 of front tire 12.

Figure 7A:
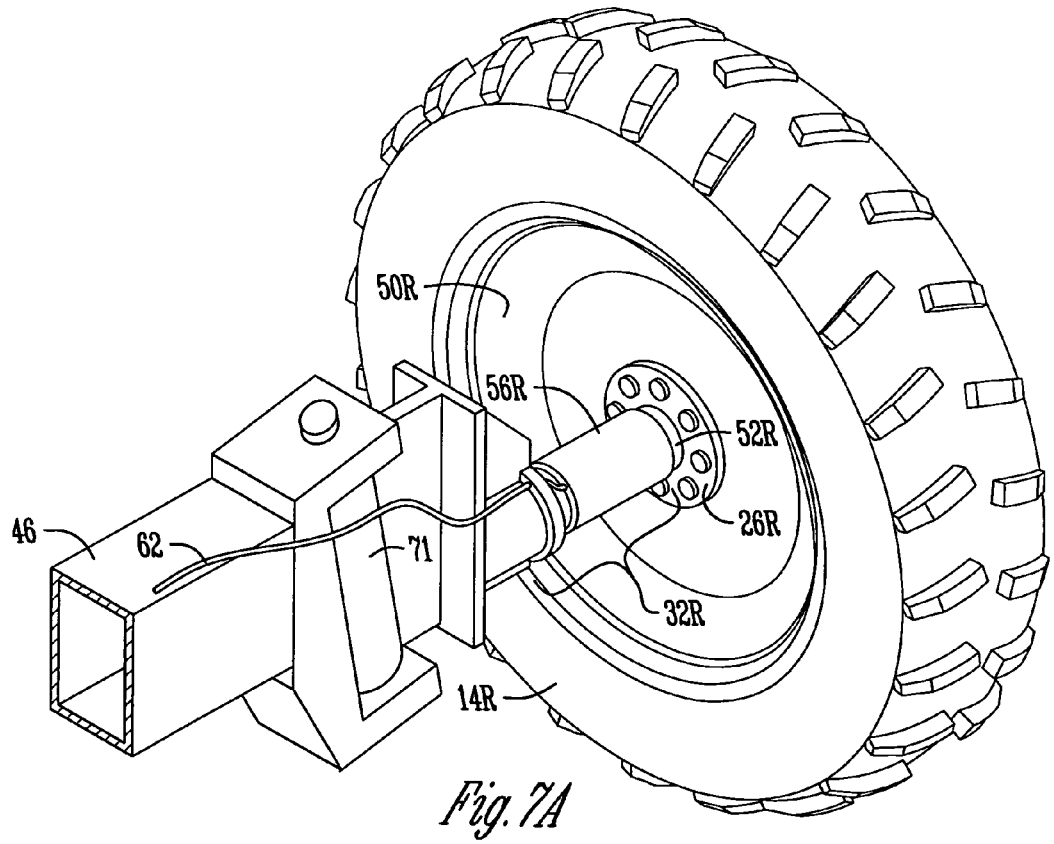
FIG. 7A is an enlarged, isolated perspective view of the rear axle assembly of FIG. 6 with one embodiment of the present invention added.

The rear weigh bars 56, such as in FIG. 7A, (Part No. 145004 spindle type from Digi-Star, LLC) are one for each rear wheel 14, mounted between each end of rear axle 46 and rear hub 26 (which are bolted to rear rims 50 of rear tires 14).

In this way the entire weight of combine 10 (except for the drive shaft is connected to the front wheels) literally supported on solely weigh bars, except for those components between the ground and the weigh bars such as drive shaft 64, final drive assembly 35, front hub 24, etc. (e.g., see FIGS. 3 and 5A). In this manner, for a relatively economical modification, with relatively non-complex structure, almost the entire combine 10, including hopper 22, rides on weigh bars 54 and 56. In this manner the load of the combine 10 can be monitored, which allows derivation of the load of just corn 28 in hopper 22 by subtraction of the load of combine 10 on weigh bars 54 and 56 when hopper 22 is empty compared to the load of combine 10 on weigh bars 54 and 56 when there is corn 28 in hopper 22.

b) Front Weigh Bar Assemblies

FIG. 4 diagrammatically illustrates the conventional drive components for one front driven wheel 12. Front dead or non-driven axle 34 extends across the front and bottom of combine 10. Final drive assemblies 35 are mounted at each end of axle 34. A drive shaft 64 is operatively connected to each final drive assembly 35. When drive shaft 64 rotates, it drives gears in final drive assembly 35 which turn a driven or live spindle (not shown) to which front hub 24 is attached. Front hub 24 is bolted to front rim 40 of front driven tire 12.

FIG. 5A illustrates diagrammatically the modification to insert the set of four weigh bars 54 so that front tire/rim 12/40 floats on the set of weigh bars 54.

Specific details and drawings of this arrangement are set forth in FIGS. 5A-B and 9A-B. Note in particular FIG. 9A, which is a generally scaled view of an entire front weigh bar assembly 30 for one front tire 12. It shows how first plate 36 is bolted to axle 34 by bolts 76. Axle 34, in this example, is a 6 inch by 9 inch by ⅜ inch front combine axle for an IH 1480 through Case IH 2388 combine. Part 79 is a truss rod to tie together the left and right sides. Arrow 77 is intended to diagrammatically illustrate bending direction.

Figure 9A:
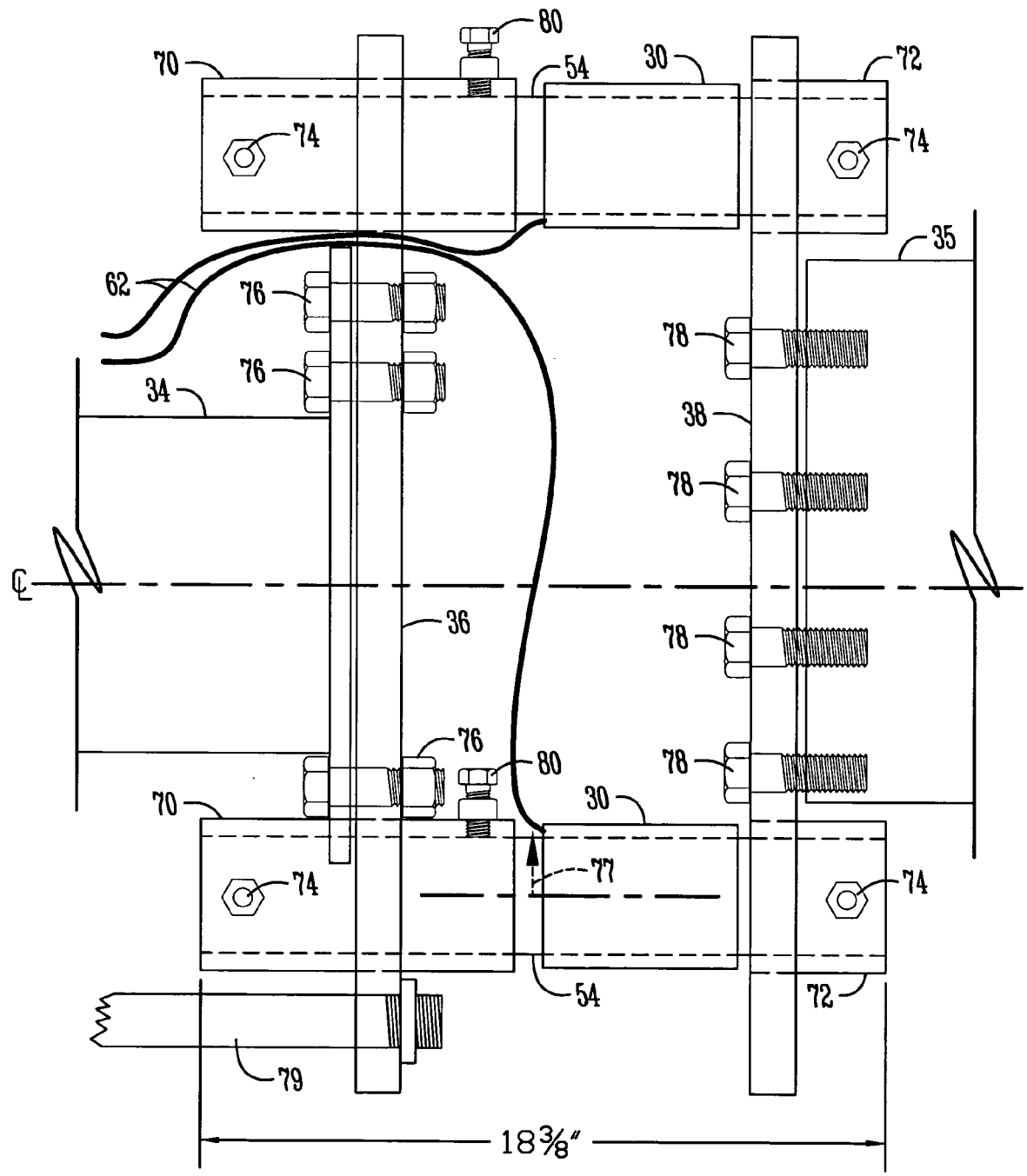
FIG. 9A is an enlarged, isolated elevation view showing one embodiment of the weigh bar assembly of the present invention.
Figure 9B:
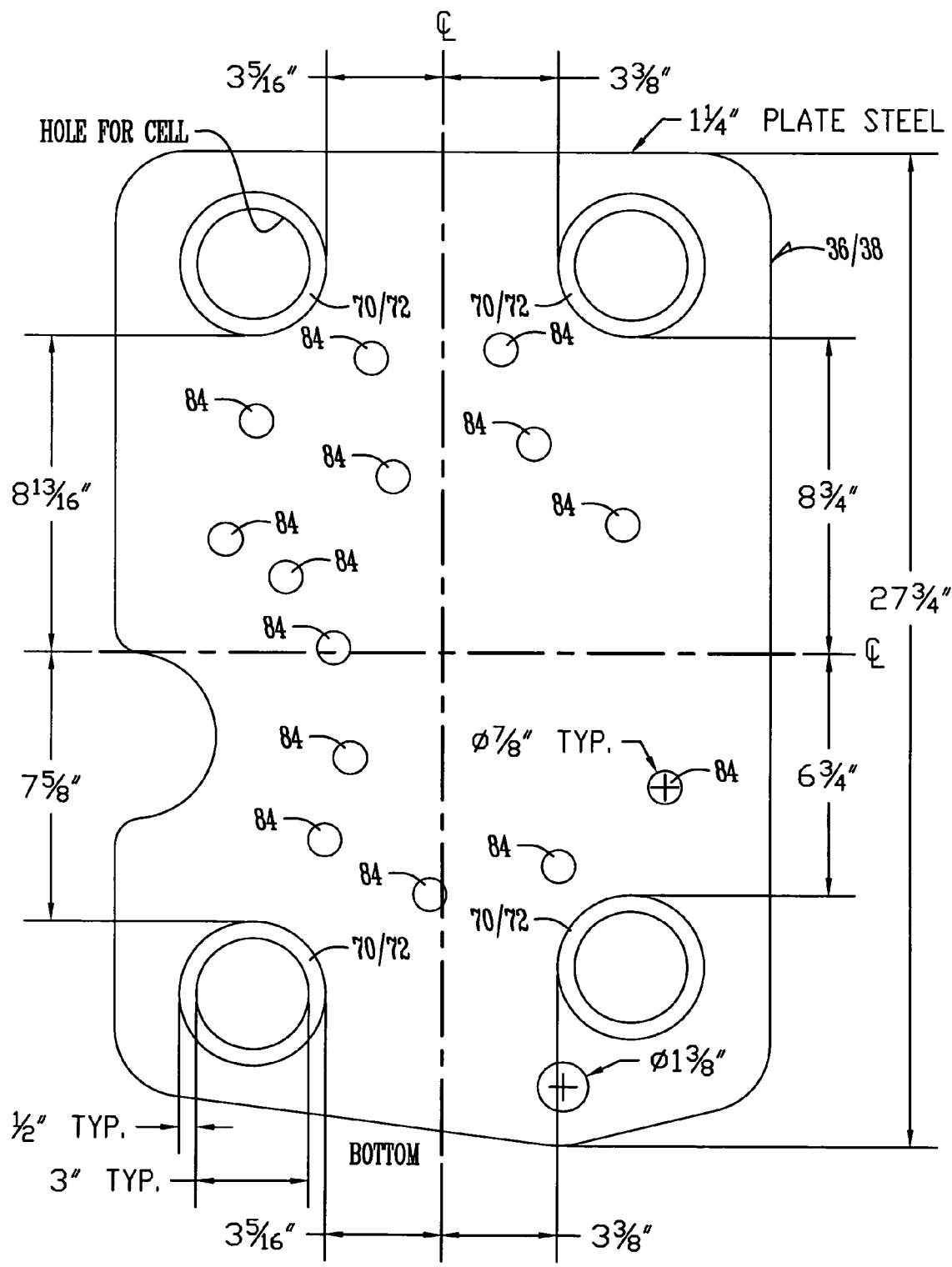
FIG. 9B is a side elevation view illustrating a support plate used in the embodiment of FIG. 9A.

FIG. 9B is a generally scaled view of a plate 36 or 38 (e.g. steel). Note that in this embodiment, plates 36 and 38 are almost identical for efficiency in manufacturing. They have a plurality of through-holes 84 in a pattern that allows one plate to be used either for (a) first plate 36 with some of holes 84 matching mounting holes on the end of axle 34, or (b) second plate 38 with some holes 84 matching mounting holes for bolts 78 to attach second plate 38 to final drive assembly 35. Certain dimensions are given on FIG. 9B to give an indication of size and placement for features of this part.

A set of four tubes or cans 70 are welded into corresponding openings in first plate 36. A set of matching four tubes or cans 72 are welded into corresponding openings in second plate 38. Opposite ends of weigh bars 54 slideably fit within corresponding aligned cans 70 and 72. Bolts 74 hold weigh bars 54 in place. Note that bolts 80 also can serve as calibration adjustments, as indicated in FIG. 9A.

Figure 8:
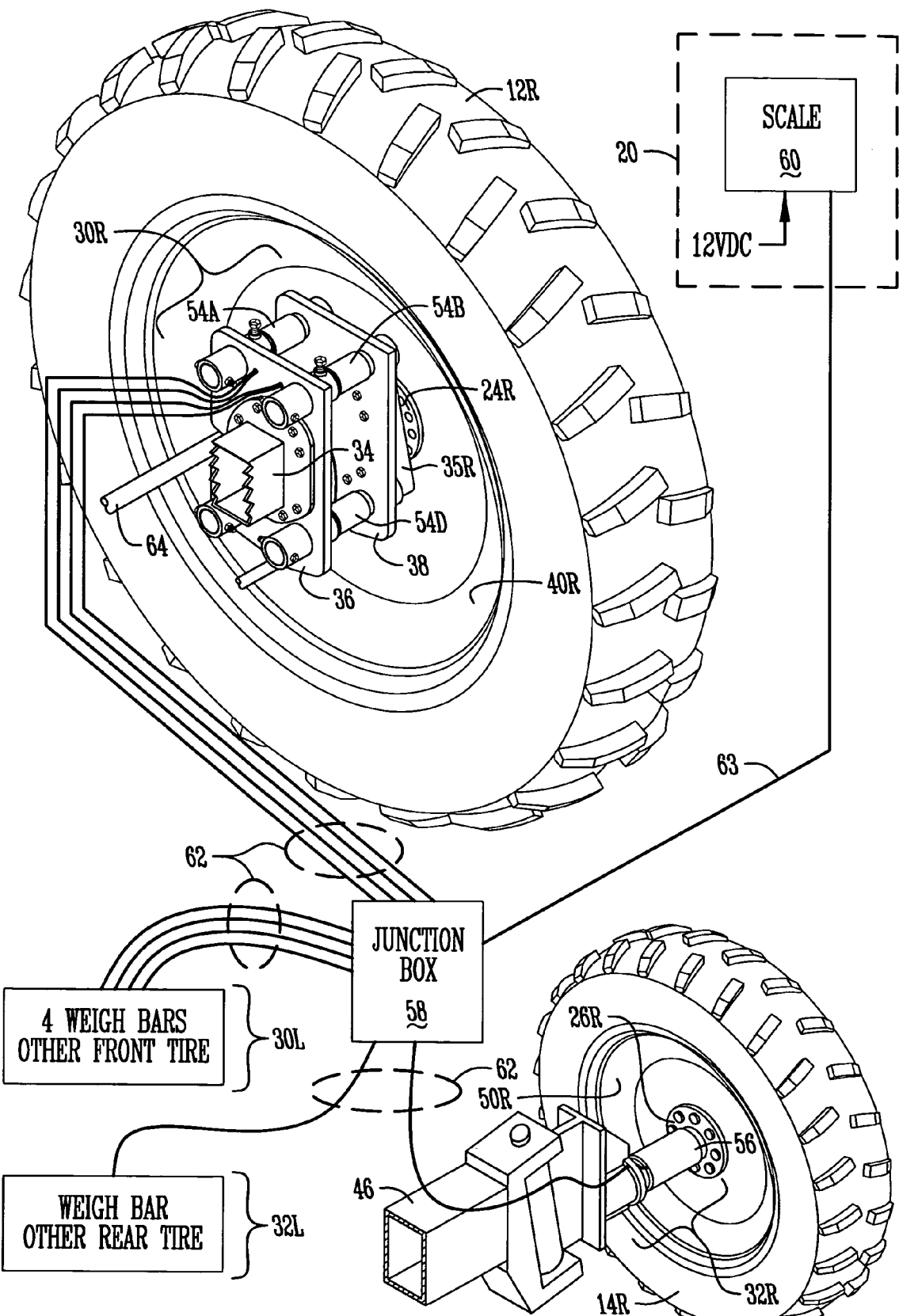
FIG. 8 is a partly diagrammatical view, partly perspective view of the sub-assemblies of FIGS. 5A and 7A and illustrating one embodiment of a circuit and components therewith.

As indicated in FIG. 9A, wires 62 can connect each of eight weigh bars 54 to a junction box 58 (see FIG. 8). Each weigh bar reports load it experiences by converting the mechanical load into an electrical signal.

An identical front weigh bar assembly 30 would be placed on the other end of front axle 34. Wires communicate each weigh bar 56 to junction box 58.

Junction box 58 would communicate a single, combined (effectively summed) signal to an intelligent device (e.g. Digi Star model EZ2000 Scale console) 60 in the combine cab 20. By appropriate calibration and programming, junction box 58 and scale console/microprocessor 60 can sum and compute the load of all ten weigh bars 54/56. A single value can thus be input from each of the ten weigh bars 54 and 56 at the same time and scale/processor 60 can convert the summed signal into a weight.

Alternative ways are possible. For example, by sampling a predetermined number of analog values from each of the load cells, scale/processor 60 could calculate an averaged value. An example of multiple cells that are sampled, averaged and summed are disclosed in U.S. Pat. Nos. 6,525,276 and 6,732,667, both incorporated herein by reference. The total load for the front of combine 10 can then be determined.

A front axle extension piece (not shown) usually comes with the conventional combine in FIG. 1. It fits between the front axle and the final drive assembly on both sides of the combine. It allows adjustment of the spacing of the front drive wheels of the combine. This may be necessary to adjust for crop row spacing or in cases where dual front tires are used. These front axle extension pieces are removed or not used, but replaced by the front weigh bar assemblies 30. Thus, the added room used by front weigh bar assemblies 30 on each side of the front axle of combine 10 does not materially change the spacing of the front tires 12, because these extension pieces can be removed. On combines without such pieces, the front axle might have to be cut off at opposite ends and front weigh bar assemblies 30 welded or bolted or otherwise attached to the shortened front axle.

c) Rear Weigh Bar Assemblies

FIG. 6 illustrates diagrammatically a conventional rear dead axle 46, spindle 52, hub 26, rim 50 and tire 14 of combine 10. Note how live spindle 52 rotates to allow tire 14 to rotate in response to movement across the ground. A king pin 71 allows pivoting of spindle 52 to allow steering of rear tire 14.

FIG. 7A diagrammatically illustrates one modification to the rear of combine 10 to place rear weigh bar assemblies 32 there. Rear weigh bar assemblies basically suspend the rear of combine 10 on two weigh bars 56L and 56R, one between each opposite end of rear axle 46 and each rear tire 14.

Figure 10:
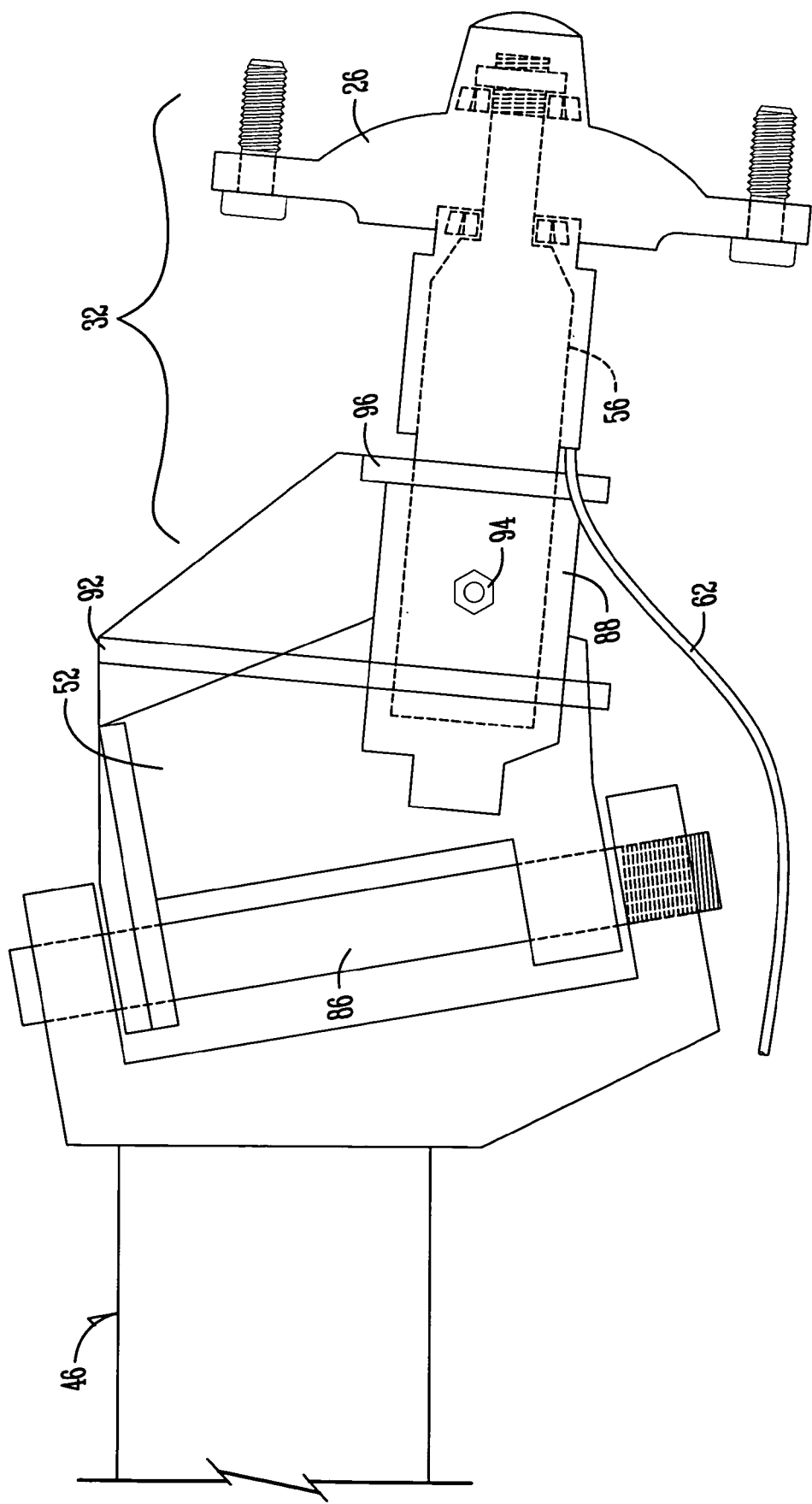
FIG. 10 is an enlarged elevation view illustrating one embodiment of a rear weigh bar assembly of the present invention is connected with a non-driven rear axle assembly of a typical combine harvesting machine.

Specific details and drawings of one way to build this arrangement are shown at FIG. 10. For the particular combine identified in FIG. 10, rear weigh bar assemblies 32 have a sleeve 88 (3"×4" steel tube) welded to O.E.M. spindle assembly portion 52 of rear axle assembly 46 as indicated. Reinforcing plates 92 can be added and welded in place after sleeve 88 (3 inch by 4 inch) is welded if indicated. The spindle-type weigh bar 56 is bolted in sleeve 88 by bolt 94 at one end, and rear hub 26 attached at the other or distal spindle end of weigh bar 56. A reinforcing plate 96 can be welded to the end of sleeve 88, if indicated.

An identical arrangement is placed on the other end of rear axle 46 for the other rear tire 14. This arrangement maintains the steerability of rear wheels 14 about king pins 86. Wires 62 from each weigh bar 56 communicates with junction box 58 and then to scale console 60 (see FIG. 8). A sampled reading of the analog signal of each bar 56 is communicated to separate inputs on junction box 58. They are summed with the eight inputs from front weigh bars 54 to get a total weight value for combine 10. Like front weigh bars 54, the pair of rear weigh bars 56 support the back of combine 10, except for essentially the wheels and tires 14 and hubs 26.

Of course, if the weight on the rear axle becomes too great, or if the rear wheels are driven, it may be necessary to use a rear load cell assembly that requires more than one weigh bar. In this scenario, two or more weigh bars can be connected between parallel reinforcing plates such as shown at reference number 32' in FIG. 7B. This configuration is similar to the front weigh bar assemblies (already described). One plate can be connected to the rear axle, the other plate can be connected to a rear final drive (not shown) or spindle assembly. The rear axle 46 may have to be extended down in length to accommodate such assemblies.

Figure 11:
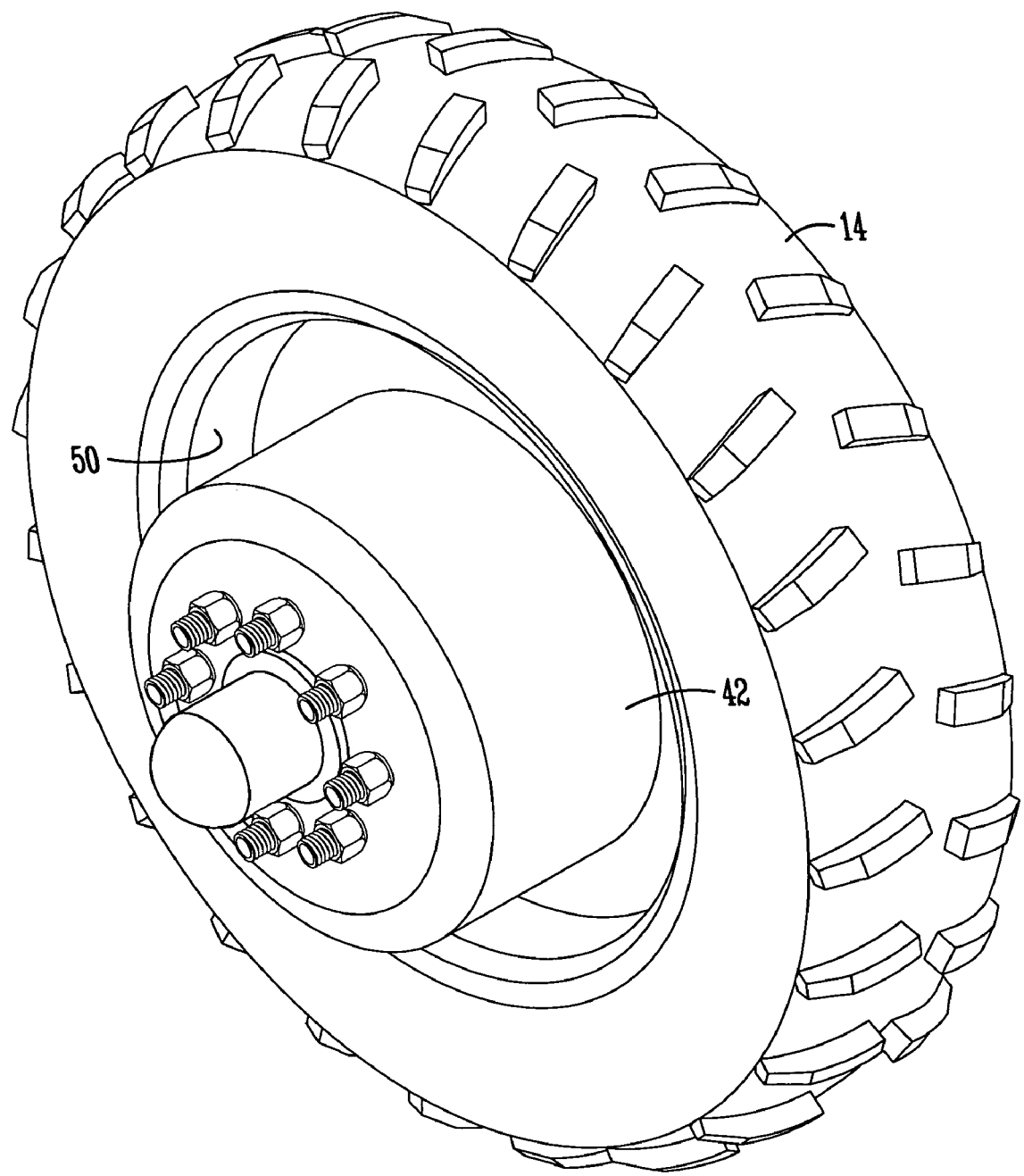
FIG. 11 is a perspective view illustrating an extension member which can be added to the rim of a combine wheel in order to maintain the original tire spacing.

FIG. 11 illustrates that the rear rims 50 for rear tires 14 can be modified. Because the addition of rear weigh bar assemblies 32 extend the position of rear hubs 26 wider laterally than normal, rear rims 50 can be modified to include an extension member 42 to extend a similar distance laterally. These extension members 42 maintain the original spacing of rear tires 14 relative to combine 10 and each other.

Operation

As diagrammatically illustrated in FIG. 8, each weigh bar 54 and 56 is connected to a conventional junction box (available from Digi-Star) on combine 10 by wires 62. A wire or bus 63 would connect junction box 58 to scale console/processor 60 to communicate the signals from the weigh bars 54 and 56 so that they can be processed. Device 60 is programmed, via ways well known in the art, to receive the electrical signal from junction box 58 and calculate what essentially is the cumulative load of the combine experienced by the weigh bars. It is preferable that combine 10 be stopped, as forces during movement along the ground can cause load signals to vary. It can provide via a digital display a derivation of weight in the following manner.

As previously described, and as is well-known in the art, one way to derive the weight from the load cells is to digitally sample the analog signals coming continuously from the load cells over a set period of time and then average those signals. As well-known, the load cells typically function by monitoring voltage across a member that experiences this strain or stress of bending from load (resistance of the material changes as it bends). By sampling and averaging, a more accurate reading of the voltage level over time can be obtained.

Since load on the weigh bars by an empty combine will be known by reading the load cells in that condition, device 60 can be programmed to run a routine that counts the number of pounds of corn as they are off-loaded combine 10. Essentially, device 60 can be pre-calibrated to measure load on the weigh bars when hopper 22 is empty to derive tare weight or empty weight of combine 10. Device 60 can then measure load on the weigh bars when hopper 22 is filled with corn to derive gross weight. Knowing these two values, by selection of the operator, device 60 can then zero its display when unloading of hopper 22, and then in real time display the difference between gross weight and tare weight during unloading. The operator thus will see the display incrementing upwardly to correspond to number of pounds off-loaded at each point in time. At the end of off-loading, the operator can record the number of pounds displayed, which corresponds to the derived number of pounds of actual corn unloaded. This avoids the operator having to subtract the tare weight of combine 10 from gross weight. This allows for weighing or tracking amount off-loaded whether the hopper is initially full or partially full.

Obviously, alternatively the microprocessor could be programmed for different routines. It could, for example, merely calculate the difference between its loaded load measurement and its unloaded load measurement and display that, even before unloading the harvested crop.

It is to be understood that load measurements can be taken at any time including while harvesting is ongoing. However, since the load cells are sensitive to vibrations and undulations in the ground will cause the same, the readings can be unreliable until the combine is stopped.

Once the weight reading for that load is calculated and displayed, it can be written down or otherwise recorded. For example, there could be an accumulation routine that would store the weight of each load from the combine that is off loaded for a particular field so that there is a digital stored reading. Alternatively, it could simply be written down or entered into a notebook, PDA, or other device.

Below are practical, real-world examples of the value of the exemplary embodiment:

Why did I design and build an electronic on-board scale for my Case IH 2188 combine such as described above? I originally owned two combines, a Case IH 2188 and a Case IH 1688. I wanted to buy a third one. I also have a 1200 bushel grain cart on tracks with a scale so we can weigh all grain from different landlords and co-mingle the grain in large storage bins. Due to the cost of another grain cart, $60,000.00, a four-wheel drive tractor, $100,000.00, another employee at $35,000.00-$50,000.00 annually, and fuel expense of $5,000.00-$7,000.00; I felt there had to be a better way.

I bought another Case IH 2188 and designed and built an electronic scale for it. I also put a hopper extension on the combine to increase the carrying capacity. I can now go to the field to harvest by myself and I take one driver and two semi-grain trailers.

In comparison to my other two combines harvesting with the grain cart; I am able to harvest more bushels any day of the week in the same amount of time per combine at a much lower cost. When two combines with 8 row heads are running with one 1200 bushel grain cart, they have an approximately 4.5 m.p.h. speed limit on them in 200 bushel per acre corn. If they go any faster than this, they will be waiting on the cart. This system had some efficiency when we had Case IH 1480's and Case 1H 1680's but with the increased capacity in the Case IH 1688, 2188, and 2388 the system is inefficient. It happens too often where we are holding the combines back for the grain cart's benefit (e.g. speed of the combine has to be reduced to match lower speed of tractor and grain cart).

For example, compare running a combine with an electronic on-board scale like the present invention versus one combine running with a grain cart with a scale. We harvest approximately 4500 acres of corn, 1500 acres per combine.

For the combine harvesting with an electronic scale, it will take that combine approximately two more days to complete the job. However, for the two extra days he will harvest, he will save approximately $9,640.00 per day (figures below are approximations and use fuel cost estimates from later in the year 2004 time frame):

| | |
|---|---|
| Employee - 240 hours @ $15.00/hr. | $3,600.00 |
| Tractor Cost - | $8,000.00 |
| Grain Cart Cost | $4,800.00 |
| Fuel Cost | $2,8880.00 |
| | $19,280.00 |

Some benefits resulting from the exemplary embodiment include:

1. Independence. This combine goes anywhere, at anytime without taking a support team with it. This combine can harvest all night on soybeans, for example, without keeping the rest of the crew awake all night. They can be ready to go on the day shift. If this combine is running with the other two combines and grain cart on soybeans and getting close to getting a field done; the combine with the on-board scale can be sent to the next field and get it opened up. He can weigh it and dump it in the truck. This prevents the other combines from sitting on the road and waiting for this to be done and increases efficiency.

2. Compaction. With zone tillage I have found that I can loosen the ground up with in-line deep tillage of 16-19 inches. But, just about anything driven back on these fields, packs them back down worse than they were before we ripped them up. Therefore we are trying to keep the grain carts, Big A's, wagons and semis out of the field and use more of a controlled traffic approach. The combine with on-board scale reduces soil compaction.

3. Weight Accuracy. We need at least the accuracy of a grain cart to divide grain with our landlords. The older grain carts with spindle type weigh bars were represented to have an accuracy of approximately 99.5%. The newer grain carts with tracks, seem to have slipped back to about 98.5% accuracy, due to the design change. The on-board scale on the combine seems to be running at or better than existing grain carts Also, knowing exactly how much weight is on a semi when it leaves a field is important.

4. Operator Comfort. Unloading, on the go, into a large grain cart with a Case IH 2188-30 foot head, combining solid seeded soybeans is taxing on the operator. It is especially difficult after the operator has been working for hours and/or after dark (e.g. sometimes combining continues well-past midnight, and sometimes around the clock). The left side of the header has to run about 6-12 inches from the tracks on the cart to fill the cart acceptably. Since there is a fairly high risk of colliding with the cart or the duals on the four wheel drive tractor, at least half of the time we stop to unload the hopper of beans. Therefore, we are losing the efficiency of using a grain cart. With the on-board scale, we can just weigh them off the combine as we dump in the truck at the end of the field.

5. Cost Savings. As outlined above, the on-board scale combine allows a farmer to spend money on more combines and not on another grain cart, tractor, employee, and fuel.

Advantages of combines with an on-board scale as an option include:
1. offer more harvesting options to more and different sized farmers.
2. offer an accurate way of weighing grain
3. offer combine independence
4. capture part of the money spent on grain cart, labor and fuel every year
5. As combine capacity increases every year, so does the need for more grain carts unless there is another option.

One very common scenario in the Midwest is a farmer that farms 4,000-5,000 acres owns two larger combines and 1 large grain cart (1200 bushel) and one four wheel drive tractor to pull it. These farmers frequently would like to trade one of the combines for a newer and larger combine for a substantial increase in capacity. But, if he does trade, he will have to buy another $50,000 cart, $100,000 used tractor and hire another employee if he wants to operate efficiently. An alternative option for this situation would be to trade for the bigger combine and use the cart solely with this combine to maximize the efficiency of the new machine But install an on-board scale kit, as described herein, on the used combine machine and make it independent, so it does not need the cart. The end result would be approximately a 40% gain of capacity with the new combine and a loss of 15% on the used combine. However, the farmer could to end up with an approximately 25% increase on the two combines, and a huge savings because he does not have to buy more carts and tractors and can still keep one of the used combines to make soybeans harvest go faster.

Options and Alternatives

As indicated previously, the invention can be implemented in a variety of different ways. Also, the manner in which it is used and for what purpose can vary. The method and apparatus can simply be used to measure weight of harvested product on the combine for any purpose. Unlike yield monitors, it is actually trying to measure a relatively reliable characteristic of grain, its weight (rather than its volumetric flow rate).

The precise configuration of the load sensing assemblies can vary. Dimensions, types and characteristics of components, and their combinations can vary according to design and need.

For example, some of the Figures show reinforcing plates or structures. They may or may not be needed depending on the particular application. Or alternative materials or constructions may eliminate their need.

The ground contacting members need not be limited to wheels having rims and tires. The ground contacting members could also be rubber tracks or other driven members.

Another option would be to integrate field location information (e.g., by using off the shelf GPS receiver) with weight information.

Figure 7B:
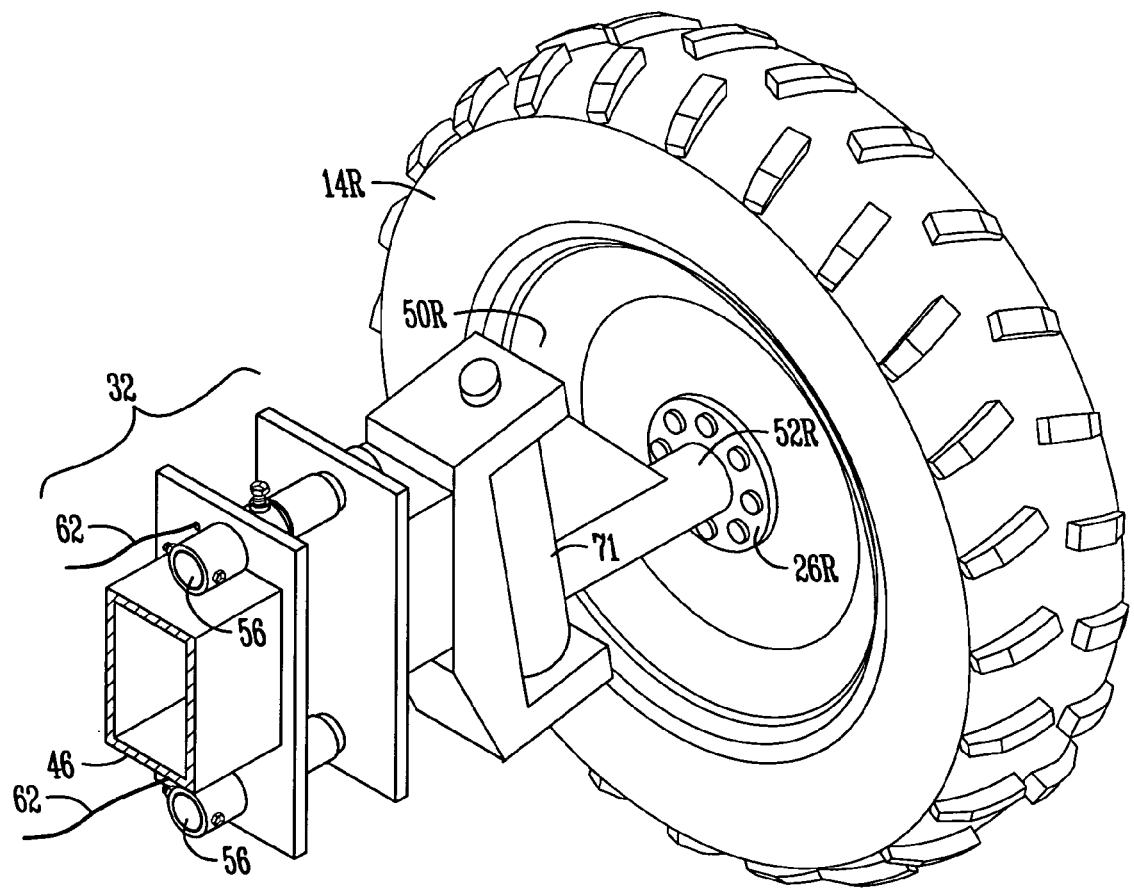
FIG. 7B is an enlarged, isolated perspective view of an alternative embodiment of the present invention added to a rear driven axle assembly such as can be used with harvesters of the type of FIG. 1.

The load sensors might be placed at other locations or in other configurations. For example, the load cell assemblies in the front axle could also be placed between the final drive assembly and the hub, or between the hub and the wheel in either the front or rear axles. The exact placement of the load cell assemblies is not critical; what is critical is that the hopper which holds the grain must be essentially fully supported by the load cell assemblies at some point in the structure of a combine. Another example in the rear axle would be between the center pivot and rear axle if the rear axle is of that type (like illustrated at FIG. 3 at reference number 48). A pair of weigh bars like weigh bars 54 could be mounted between two plates that would be attached to center pivot 48 and rear axle 46 respectively. The readings of the two (or more) weigh bars 54 would be averaged and then added to averaged readings from the weigh bars at each front wheel to derive overall weight of the combine on the weigh bars. As mentioned previously and as shown in FIG. 7B, a load cell assembly similar to what is shown on the front axle in FIG. 5A can also be placed in the rear axle if this configuration is preferred by the operator. As previously mentioned, if stronger structural support between the ground contacting wheels and the rear of the combine are needed than a single load cell on each side, two or more load cells per side on the rear could be utilized. One way would be to utilize a similar strategy is the front load cell assemblies. Two parallel load cells, for example, could be mounted tubular cans that are welded to opposed parallel plates. One plate could be fixed to the rear axle and the other plate to the wheel or spindle. This arrangement is likely required if the rear axle has drive assist or is driven. It may require cutting of the rear dead axle to fit it in. It could be placed inside any final drive assembly to the rear wheel. FIG. 7B illustrates such an arrangement.

It should also be understood that the precise orientation of the load cells can vary. They have been shown to be generally horizontal. However, they could be angled to horizontal or could even be vertical if the connecting structure to their opposite ends is appropriately configured.

The way in which the analog signals from the load cells is communicated to a weigh scale can vary. In FIG. 8, the ten load cells are simply connected to a junction box 58 where they would essentially be combined into one output. This is an essentially summing of these signals. Scale 60 would then convert that signal into a weight display based on calibration. Another example would be to have several junction boxes, each having a single output into succeeding junction boxes until there is one output to send to scale 60. For example, the output of four load cells from 54 from one front wheel as well as the outputs from the two rear load cells 56 could be put into a first junction box. The outputs from the four load cells of the other front wheel could be put into another junction box. Each junction box could have a single output into a third junction box. The single output of the third junction box would then be the combination or summing of all ten load cells. An obvious alternative, if available, would be one junction box having ten inputs and one output.

Another example would be the front load sensing assemblies. Instead of the double plate assemblies (with four weigh bars between) which are bolted in place, they might be welded directly to the front axle and/or the final drive assembly.

One aspect of the invention could be to enlarge the on-board hopper 22. As indicated by dashed lines in FIG. 1, a larger hopper 22B could not only hold more grain, and require fewer stops for off-loading, it optionally could be configured to extend rearwardly on combine 10. Satisfactory structural supports likely would be added (see dashed lines). Also, larger and/or stronger axles might be indicated, as well as bigger tires (particularly in rear), to support the added load. Capacities on the order of 500 or more bushels are possible, which can weigh on the order of thirty-two thousand or more pounds. By rearward extension of hopper 22B, there could be more equalization of load on front and rear axles, which would be beneficial for operation, movement and fuel usage of combine 10. Adding a larger than stock unloading auger (e.g. 20" diameter) could also help efficiently off-load the larger amount of grain.

It is possible to combine other information with the load or derived weight information. For example, variations in actual weight caused by moisture could be factored into the weight of the crop derived by the invention. This could allow an estimate of dry weight of the corn, which could be converted into bushels. This could allow the amount of crop harvested to be characterized by volume instead of weight by known relationships. Moisture content of the corn being harvested can be derived by a variety of known ways. This could, with appropriate means, be derived and communicated to device 60 (or some other digital device), which can take that into account when calculating its displayed weight value. It might even convert to bushels and display bushels. Alternatively, it can be communicated to the operator who can record it or program it into device 60, if possible, or into some other programmable device. For example, a sample of corn from a load taken to a storage location or grain elevator location could be tested there and the moisture value communicated by radio or otherwise to the combine operator. There are on-board moisture monitors that could automatically communicate a moisture value to device 60 or to the operator. Correlating moisture content with the harvested crop being weighed would allow more accuracy in providing the equivalent amount of corn at a later time and possibly a different moisture content, as is well known in the art. There could be components used that would give a tape or hard copy print out of the weight or bushels measured by the invention.

These are but a few examples of options and alternatives for the invention. The principles taught herein can be applied in analogous ways to a variety of harvesting machines and a variety of applications.

As can be seen, the invention meets or exceeds the stated objectives. It provides the delicate balance between figuring out how to essentially support the entire combine except for its ground contacting members unload cells, even when at least one axle has driven wheels. In the detailed embodiment, this was made possible by creating special assemblies that fit between the dead axle and the driven wheel on both sides of the front of the combine. These special assemblies utilize a plurality of load cells so that they could support a substantial weight on the front end of that combine but truly isolate the front of the combine from the wheels to get accurate weight measurements. A plurality of weigh bars was required, for those models of weigh bars, to both structurally support the front end of the combine but also provide weight readings that could be summed. For a combine of the type of FIG. 1, 70% of the weight is on the front wheels. A single load cell could not support that weight at each front wheel.

The embodiment also, however, had to fit within the constraints of the front end of the combine. The operator had to rely on those assemblies to support the weight of the combine and not worry about the braking off or effecting the support or handling of the combine substantially. As shown in the examples given in this description, the arrangement of on-combine weighing has many advantages, including time, labor, and money savings.

What is claimed is:

1. A self-propelled harvesting machine comprising:
 a. a body comprising an engine, an operator's station, and a container for harvested product;
 b. a plurality of ground-contacting members;
 c. at least one weight sensor mounted between the body and the ground-contacting members substantially supporting the body on the ground-contacting members, so that weight measured by each weight sensor can be used to derive weight of any harvested product in the container.

2. The machine of claim 1 wherein the machine is a grain harvesting machine and the container is a grain hopper.

3. The machine of claim 1 wherein the ground-contacting members are wheels.

4. The machine of claim 1 wherein the ground-contacting members are tracks.

5. The machine of claim 1 wherein the weight sensor is a load cell.

6. The machine of claim 5 further comprising a device adapted to convert a signal from the load cell into a weight.

7. The machine of claim 1 wherein said at least one weight sensor comprises a plurality of weight sensors, each weight sensor supporting a portion of the body relative the ground-contacting members.

8. The machine of claim 7 wherein said plurality of ground-contacting members comprises a first set of ground-contacting members, wherein said first set of ground-contacting members are in operative connection to the engine and said plurality of weight sensors comprises a plurality of load cells for each driven ground-contacting member.

9. The machine of claim 8 wherein the plurality of load cells are mounted substantially in parallel between a pair of mounting plates to each provide a portion of support for the body relative its corresponding ground-contacting member and cumulatively measure load on that ground-contacting member.

10. The machine of claim 9 further comprising a final drive assembly (a) operatively connected between the engine and at least one driven ground-contacting member to allow selective driving of the driven ground-contacting member and propulsion of the machine and (b) operatively mounted between the plurality of load cells and each at least one of said driven ground-contacting members to substantially support the driven ground-contacting member relative the plurality of load cells.

11. The machine of claim 10 wherein each of said driven ground-contacting members comprises a final drive assembly (a) operatively connected between the engine and a said driven ground-contacting member to allow selective driving of the driven ground-contacting member and propulsion of the machine and (b) operatively mounted between the plurality of load cells and each a said driven ground-contacting member to substantially support the driven ground-contacting member relative the plurality of load cells.

12. The machine of claim 8 wherein said plurality of ground-contacting members further comprises a second set of ground-contacting members.

13. The machine of claim 12 wherein said second set of ground-contacting members are non-driven.

14. The machine of claim 13 wherein the weight sensor comprises a load cell between the body and each non-driven ground-contacting member.

15. The machine of claim 14 wherein the load cell comprises part of a spindle for the non-driven ground-contacting member.

16. The machine of claim 14 wherein the weight sensor comprises a plurality of load cells between the body and each non-driven ground-contacting member.

17. The machine of claim 12 wherein said second set of ground-contacting members are operating connected to a drive assist on the body of the machine.

18. The machine of claim 8 wherein each load cell comprises a circuit adapted to generate a signal indicative of load on the load cell, and further comprising a junction box into which the signal from each of the plurality of load cells is communicated and summed.

19. The machine of claim 18 further comprising a device adapted to receive the summed signal from the junction box and derive total weight of the machine and anything carried on the machine.

20. A self-propelled grain harvesting machine comprising:
   a. a body comprising a frame, an engine, an operator's station, a harvesting head, a processing subsystem, and on-board hopper, and an unloading subsystem for harvested product;
   b. a plurality of ground-contacting members operatively mounted to the frame adapted to support the body on the ground;
   c. a drive assembly operatively connected between the engine and at least one of the ground-contacting members;
   d. at least one weight sensor mounted between each ground-contacting member and the frame substantially supporting the body on the ground-contacting members, so that weight measured by each weight sensor can be used to substantially derive total weight of the body and anything carried on the body, including any harvested product.

21. The machine of claim 20 wherein the machine is a grain combine.

22. The machine of claim 20 wherein the plurality of ground-contacting members comprise a pair of driven members, each of the pair having a final drive assembly operatively connected to it and the engine, and the at least one weight sensor comprising a plurality of load cells operatively mounted between the frame and the final drive assembly for each driven member.

23. The machine of claim 22 wherein the plurality of ground-contacting members comprise a pair of non-driven members, and the at least one weight sensor comprising at least one load cell operatively mounted between the frame and each non-driven member.

24. The machine of claim 22 wherein the plurality of ground-contacting members comprise a second pair of driven members, and the at least one weight sensor comprising at least one load cell operatively mounted between the frame and the second pair of driven members.

25. The machine of claim 22 wherein the number of said plurality of load cells is determined by amount of structural support needed to support the body.

26. The machine of claim 20 further comprising an electrical circuit operatively connecting each weight sensor to a device that can derive weight of the machine and anything carried on the machine.

27. The machine of claim 26 wherein the weight sensor comprises one or more load cells, each of which generates an electrical signal commensurate with load experienced by it, and the device to derive weight comprises a junction box in electrical communication with each load cell and an electronic scale adapted to convert the electrical signals from each load cell into a cumulative weight value.

28. The machine of claim 27 wherein the electronic scale samples the electrical signals from at least one load cell and averages the electrical signal over a period of time or number of samples.

29. The machine of claim 27 wherein the electronic scale is located at the operator's station.

30. A self-propelled harvesting machine, comprising:
   a. a body comprising a frame; a power source on the frame; and a hopper for storing harvested product as the harvesting machine harvests;
   b. front and rear axle assemblies connected to the frame, each axle assembly having first and second opposite ends;
   c. a load sensor assembly, comprising at least one load cell, mounted on each of the first and second opposite ends of the front axle assembly;
   d. a load sensor assembly, comprising at least one load cell, mounted between the body and the first and second opposite ends of the rear axle assembly;

e. a ground contacting member mounted to each load sensor assembly on opposite ends of the front axle assembly;

f. a ground contacting member mounted to each opposite end of the rear axle assembly and also having an operative connection to the power source;

g. so that the harvesting machine body, including the hopper, is at least substantially supported by the load sensor assemblies on the ground contacting members;

h. each load sensor adapted to produce an electrical signal proportional to physical load applied on the load sensor;

i. an electrical circuit adapted to operatively communicate the electrical signal from each load sensor to a device capable of deriving weight experienced by the load cells.

31. The machine of claim 30 further comprising;

a. an intelligent control in communication with the plurality of load cell assemblies;

b. the intelligent control being capable of converting the electrical signals produced by the load cell assemblies into the physical weight experienced by the load cell assemblies.

32. The harvesting machine of claim 30 wherein the plurality of load cell assemblies is comprised of a first load cell assembly having first and second plates spaced apart in generally parallel relation to each other; at least one load cell having opposite ends wherein one end is supported by the first plate and the second end is supported by the second plate; the at least one load cell capable of producing an electrical signal when a physical load is applied on the at least one load cell.

33. The harvesting machine of claim 32 wherein the plurality of load cell assemblies is comprised of a second load cell assembly having at least one load cell having opposite ends; and a sleeve coupled to the rear axle assembly and slideably fitted on one end of the at least one load cell.

34. The harvesting machine of claim 30 wherein the first and second ends of the front axle assembly each have a hub; and a load cell assembly between the hub and the ground contacting member so that the load cell assembly connects the hub to the ground contacting member.

35. The harvesting machine of claim 30 wherein the ground contacting member is a wheel, the wheel having a rim and a tire.

36. The harvesting machine of claim 30 wherein the ground contacting member is a track.

37. The harvesting machine of claim 30 wherein the first and second ends of the front axle assembly each have a hub; the front axle assembly having a final drive assembly; a load cell assembly between the final drive assembly and the hub so that the load cell assembly connects the final drive assembly to the hub.

38. The harvesting machine of claim 30 wherein the first and second ends of the front axle assembly each have a hub; the front axle assembly having a final drive assembly; the first plate on the first load cell assembly being connected to the final drive assembly; the second plate on the first load cell assembly being connected to the hub so that the load cell assembly connects the final drive assembly to the hub.

39. The harvesting machine of claim 30 wherein the front axle assembly is comprised of a dead axle and a final drive assembly; a load cell assembly between the dead axle and the final drive assembly so that the load cell assembly connects the dead axle to the final drive assembly.

40. The harvesting machine of claim 30 wherein the front axle assembly has a final drive assembly, the final drive assembly being driven by a power source external to the front axle assembly but contained within the harvesting machine.

41. The harvesting machine of claim 30 further comprising a frame having a pivotal mount for the rear axle assembly; a load cell assembly between the pivotal mount and the rear axle assembly so that the load cell assembly pivotally connects the pivotal mount to the rear axle assembly.

42. The harvesting machine of claim 30 wherein the rear axle assembly comprises a spindle and a hub; the spindle being operatively connected to the hub; the spindle being comprised of a load cell assembly.

43. The harvesting machine of claim 30 wherein the load cell assembly is comprised of at least one load cell having opposite ends; a sleeve coupled to the rear axle assembly and slideably fitted on one end of the at least one load cell; the other end of the at least one load cell being in operative connection with the hub.

44. The harvesting machine of claim 30 wherein the hopper is an extra large storage hopper capable of holding at least 500 bushels of corn.

45. The harvesting machine of claim 30 wherein the ground contacting member is comprised of a wheel having a tire, a rim, and an extension member; the extension member being connected to the rim and protruding outwardly from the rim; the extension member being connected to the hub so that when the hub is connected to the at least one load cell, the extension member offsets the axle length added by the load cell assembly so that the rear tires are the same distance apart as before the load cell assembly was added.

46. A self-propelled harvesting machine, comprising:

a. front and rear axles;

b. a final drive assembly;

c. first and second plates;

d. the first plate being coupled to the front axle;

e. the second plate being coupled to the final drive assembly;

f. at least one load cell having opposite ends with one end connected to the first plate and the second end connected to the second plate;

g. the at least one load cell capable of producing an electrical signal when a physical load is applied on the at least one load cell.

47. The harvesting machine of claim 46 further comprising an intelligent control in communication with the at least one load cell; the intelligent control being capable of converting the electrical signal into the physical weight experienced by the at least one load cell; a digital display in communication with the intelligent control capable of displaying to a user the weight experienced by the at least one load cell.

48. The harvesting machine of claim 46 wherein the first and second plates have a plurality of through holes; the first plate having a first tube that is coupled to the first plate so that an axis of one of the holes in the first plate aligns with the axis of the first tube; the second plate having a second tube coupled to the second plate so that an axis of one of the holes in the second plate aligns with the axis of the second tube; the first and second tubes on the first and second plates being aligned so that the axes of the tubes are in alignment; the opposite ends of the at least one load cell slideably fitted within the corresponding aligned tubes in the first and second plates.

49. The harvesting machine of claim 46 wherein the at least one load cell comprises four load cells; four pairs of first and second tubes are coupled to the first and second plates so that each pair of tubes is in axial alignment with each other and a corresponding pair of holes in the first and second plates; the opposite ends of each load cell slideably fitted within a corresponding pair of aligned tubes in the first and second plates.

50. The harvesting machine of claim 46 wherein the harvesting machine is a grain harvesting machine.

51. The harvesting machine of claim 50 wherein the grain harvesting machine is a combine.

52. A self-propelled harvesting machine, comprising:
   a. a rear axle assembly;
   b. a sleeve coupled to the rear axle assembly;
   c. at least one load cell having opposite ends with one end being slideably fitted within and attached to the sleeve;
   d. the other end of the load cell being attached to a rear hub;
   e. the at least one load cell capable of producing electrical signals corresponding to a physical load.

53. The harvesting machine of claim 52 further comprising an intelligent control in communication with the at least one load cell; the intelligent control being capable of converting the electrical signals into the physical weight experienced by the at least one load cell; a digital display in communication with the electronic processor capable of displaying the weight to a user.

54. The harvesting machine of claim 52 further comprising first and second rear tires; first and second rims operatively engaged with the first and second rear tires; an extension member attached to the first and second rims which allows the user to maintain the same distance between the first and second rear tires as before the at least one load cell was added.

55. A method of weighing grain on a self-propelled harvesting machine, the harvesting machine having a hopper for storing grain as the grain is gathered by the machine, the harvesting machine further comprising a plurality of ground contacting members and front and rear axle assemblies for supporting the weight of the machine, the method comprising:
   a. placing a plurality of load cell assemblies in the front and rear axle assemblies of the grain harvesting machine so that the harvesting machine, including the hopper, is supported solely by the plurality of load cell assemblies except for the ground contacting members and any portion of the front and rear axle assemblies between the load cell assemblies and the ground contacting members, the load cell assemblies capable of producing electrical signals in response to a physical load;
   b. communicating the electrical signals from the load cell assemblies to an intelligent control capable of converting the electrical signals produced by the load cell assemblies into the physical weight experienced by the load cell assemblies;
   c. deriving the physical weight on the plurality of load cell assemblies when the hopper is empty;
   d. filling the hopper with grain;
   e. deriving the physical weight on the plurality of load cell assemblies when the hopper contains grain which is ready to be removed from the hopper;
   f. calculating the difference between the physical weight on the plurality of load cell assemblies when the hopper contains grain and when the hopper is empty to obtain the weight of the grain in the hopper.

56. A method of grain harvesting with a self-propelled grain harvesting machine having a plurality of ground-contacting members supporting the remainder of the machine, including an on-board harvested product hopper, on the ground comprising:
   a. measuring load between a substantial part of the body and the ground-contacting members when the hopper is empty of harvested product, and converting the measure of load into a first weight value;
   b. harvesting with the machine to at least partially fill the hopper with harvested product;
   c. measuring load between the substantial part of the body and the ground-contacting members when the hopper is at least partially full with harvested product, and converting the measure of load into a second weight value;
   d. comparing the first and second weight values to derive a third weight value, the weight of the harvested product in the hopper.

57. The method of claim 56 further comprising recording the third weight value, and off-loading the harvested product to a truck, trailer or wagon for transport to another location.

58. The method of claim 56 further comprising using the third weight value to determine a division of the harvested product at a later time.

59. The method of claim 56 repeating steps b.-d.

\* \* \* \* \*